United States Patent
Zhang

(10) Patent No.: US 10,404,546 B2
(45) Date of Patent: Sep. 3, 2019

(54) MULTI-TIER FAULT TOLERANT NETWORK DESIGN WITH QUALITY OF SERVICE CONSIDERATIONS

(71) Applicant: AT&T Intellectual Property I, L.P., Atlanta, GA (US)

(72) Inventor: Weiyi Zhang, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 142 days.

(21) Appl. No.: 15/435,528

(22) Filed: Feb. 17, 2017

(65) Prior Publication Data
US 2018/0241636 A1    Aug. 23, 2018

(51) Int. Cl.
  *H04L 12/24*    (2006.01)
  *H04L 12/721*   (2013.01)
  *H04L 12/707*   (2013.01)

(52) U.S. Cl.
  CPC ............ *H04L 41/145* (2013.01); *H04L 41/12* (2013.01); *H04L 45/12* (2013.01); *H04L 45/24* (2013.01); *H04L 41/5006* (2013.01)

(58) Field of Classification Search
  CPC .... H04W 24/02; H04W 28/02; H04L 41/145; H04L 41/12
  See application file for complete search history.

(56) References Cited

U.S. PATENT DOCUMENTS

| | | | |
|---|---|---|---|
| 6,999,432 B2 | 2/2006 | Zhang et al. | |
| 7,609,637 B2 | 10/2009 | Doshi et al. | |
| 8,340,008 B2 | 12/2012 | Boyina et al. | |
| 8,576,833 B2 | 11/2013 | Qui et al. | |
| 8,650,226 B2 | 2/2014 | Bobick et al. | |
| 9,264,353 B2 | 2/2016 | Krishnaswamy et al. | |

(Continued)

FOREIGN PATENT DOCUMENTS

WO    2012019317    2/2012

OTHER PUBLICATIONS

Varshney et al., "Multilevel Fault-tolerance for Designing Dependable Wireless Networks," Proceedings of the 36th Hawaii International Conference on System Sciences (HICSS '03), Jan. 6-9, 2003, IEEE 2003.

(Continued)

*Primary Examiner* — Shukri Taha
(74) *Attorney, Agent, or Firm* — Hartman & Citrin LLC

(57) ABSTRACT

Concepts and technologies disclosed herein are directed to a multi-tier fault tolerant network design with Quality of Service ("QoS") considerations. According to one aspect, a network planning system can identify at least one critical site of a plurality of sites. The critical site is considered to be critical for survivability of a network. The network planning system can construct a topology that connects the plurality of sites. The network planning system can determine a shortest path for each network link in the topology. The network planning system can check a service level agreement to determine a reliability requirement for each link in the topology that is not connected to the critical site. The network planning system can implement a reliable adaptive multipath provisioning algorithm to adaptively determine a bandwidth allocation on each link in the topology based, at least in part, upon the shortest path and the reliability requirement.

20 Claims, 20 Drawing Sheets

(56) References Cited

U.S. PATENT DOCUMENTS

| | | | |
|---|---|---|---|
| 2003/0233578 A1 | 12/2003 | Dutertre | |
| 2009/0178046 A1* | 7/2009 | Jain | G06F 9/5005 |
| | | | 718/104 |
| 2010/0223364 A1* | 9/2010 | Wei | H04L 29/04 |
| | | | 709/220 |
| 2016/0100324 A1 | 4/2016 | Henry et al. | |
| 2017/0264449 A1* | 9/2017 | Seetharaman | H04L 67/1008 |

OTHER PUBLICATIONS

Al-Shuwaili et al., "Coded Network Function Virtualization: Fault Tolerance via In-Network Coding," IEEE Wireless Communications Letters, Sep. 16, 2016, pp. 644-647, vol. 5, Issue 6.

* cited by examiner

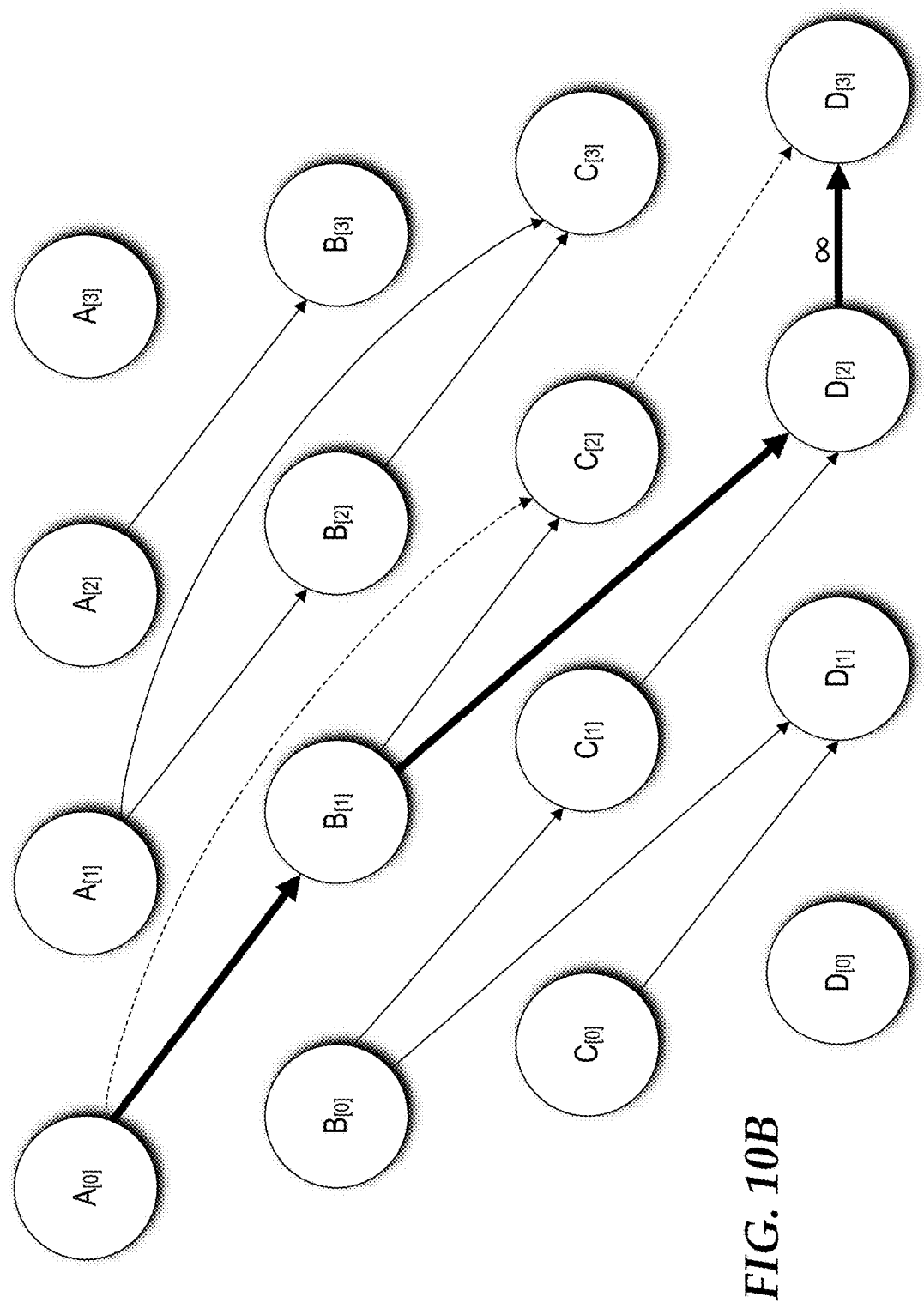

MULTI-TIER FAULT TOLERANT NETWORK DESIGN WITH QUALITY OF SERVICE CONSIDERATIONS

BACKGROUND

The Internet has migrated from a best-effort service model to an integrated service model to support data, voice, and video applications such as, for example, Internet Protocol ("IP") television ("IPTV"), Voice-over-IP ("VoIP"), and video on-demand. Given the immense scale of networks and the monetary cost of Internet downtime, service survivability issues are of paramount importance to any network provider. For some financial and retail businesses, the cost of Internet downtime can be in excess of a million dollars an hour. Considering the enormous amount of data carried on the Internet, there are tremendous needs for robustness and reliability in any modern network.

Recovery schemes have been defined and analyzed for network fault tolerance. Network fault tolerance is primarily concerned with the smallest amount of damage that can disconnect a network or reduce its performance to unacceptable levels or result in a total network failure. One of the most popular fault tolerance schemes is path protection switching. Path protection switching utilizes pre-assigned capacity between nodes for protection. In dedicated protection, the resources for the recovery entity are pre-assigned for the sole use of the protected transport path. In shared protection, the resources for the recovery entities of several services are shared. The resources may be shared as 1:n or m:n and are shared on individual links.

There are two major issues with previous popular fault tolerance schemes. One issue is that it is difficult to strike a balance between network resource efficiency and the simplicity of protection schemes. In other words, previous fault tolerance schemes are either too costly in terms of network resource usage or too complicated to be practically applied. For example, a dedicated path protection scheme is the simplest scheme that has a single entity for each working entity, but the dedicated path protection scheme produces a 100% protection overhead. Even with improvements a dedicated path protection scheme remains resource intensive. Protection costs generally are around 80% of the cost for working connections. Given the limited resources and ever-growing user demands, it is practically impossible to provide dedicated protection for each connection within a given network. On the other hand, network operators prefer to use simple and straightforward approaches. Shared path protections, which can save network resources by sharing the protection bandwidth of disjointed connections, are generally very complicated and difficult to implement. Moreover, the recovery time of shared path protection schemes could be as high as 5 seconds or more, while the typical required recovery time is around 50 milliseconds. Thus, shared protection is rarely implemented in practice and more focus is on providing end-to-end connection availability based on dedicated protection. It is desirable for network service providers to have a protection scheme that is simple, easy to implement, and efficient in terms of running time and network resource usage.

The second major issue with previous protection schemes is the lack of consideration of traffic differentiation for protection. This is because not all network locations or connections are equally important. Some network locations or connections are more significant than others and should be given higher protection priorities. For example, the 9/11 tragedy in New York City has made clear the extent to which an increasing dependence on telecommunication networks permeates day-to-day operations. After the collapse of the World Trade Center towers, three New York counties lost their connection to the statewide computer system when a major telecommunication hub located at ground zero failed. With a combined population of 3.7 million, all three counties had significant interaction with the state, making the service failure a noteworthy interruption during this tragedy. The communication hub at ground zero therefore was much more important than the equipment operated at less populous areas.

Targeted attacks at the most connected nodes have the potential to fragment scale-free networks, revealing a significant lack of network survivability. Clearly, some network locations/connections deserve higher priority and better protections than others. Moreover, most previous protection and restoration schemes were designed for the all-or-nothing protection. These schemes are overkill for data traffic. Although the provisioning of two disjointed paths provides better network survivability, this provisioning scheme imposes at least a 100% protection bandwidth overhead. Not all of the applications or transmissions require the same level of fault tolerance performances. While voice generates constant bit rate traffic, data traffic is bursty giving the advantage that data applications can continue operation, possibly at a lowered performance, even if the capacity along the path is reduced. For example, a wide-area enterprise storage network, while slowing down, can still function if failures reduce the underlying network capacity by 50%. In other words, unlike voice that has a binary service up or down condition, data services can survive gradual degradation as the available bandwidth is reduced. In many practical situations, it is helpful to execute an application with reduced quality of service—for example, a black-and-white video conference tool may still be very useful if there is not sufficient bandwidth for full color video, or likewise a decrease in resolution. For such applications, instead of providing fast and full protection, a main goal for network service providers is to provide adaptive and reliable connections with finer granularity of protection.

SUMMARY

Concepts and technologies disclosed herein are directed to multi-tier fault tolerant network design with Quality of Service ("QoS") considerations. According to one aspect of the concepts and technologies disclosed herein, a network planning system can identify at least one critical site of a plurality of sites. The critical site is considered to be critical for survivability of a network. The network planning system can construct a topology that connects the plurality of sites. The network planning system can determine a shortest path for each network link in the topology. The network planning system can check a service level agreement to determine a reliability requirement for each link in the topology that is not connected to the critical site. The network planning system can implement a reliable adaptive multipath provisioning algorithm to adaptively determine a bandwidth allocation on each link in the topology based, at least in part, upon the shortest path and the reliability requirement.

In some embodiments, the network planning system can identify the site considered to be critical for survivability of the network based, at least in part, upon a traffic size served by the site. Alternatively or additionally, the network planning system can identify the site considered to be critical for survivability of the network is based, at least in part, upon a geographical location of the site. Alternatively or additionally, the network planning system can identify the site considered to be critical for survivability of the network is based, at least in part, upon a population served by the site.

In some embodiments, the topology includes a 2-connected graph. The topology can be based, at least in part, upon a multi-tier network fault tolerant design. The multi-tier network fault design a first tier associated with a physical layer of the network and a second tier associated with a network layer of the network.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10B is a graph illustrating an auxiliary graph after a transformation for IRAMP.

DETAILED DESCRIPTION

Figure 1:
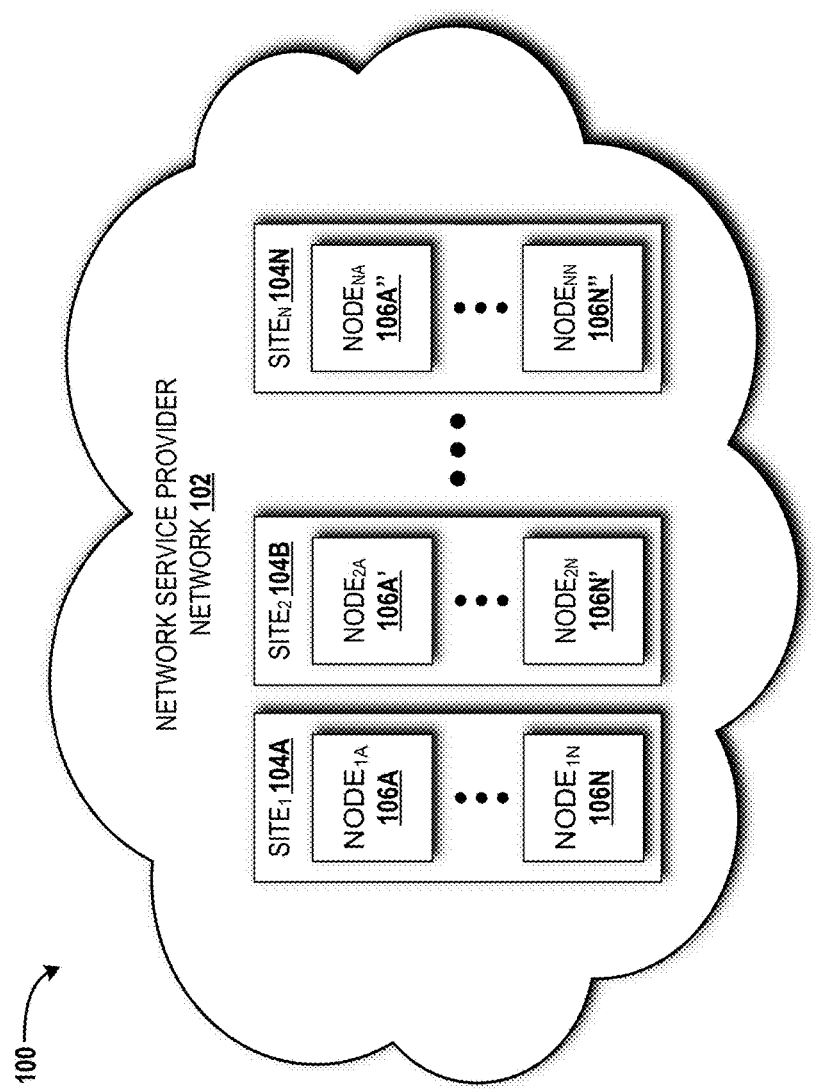
FIG. 1 is a block diagram illustrating a network environment in which aspects of the concepts and technologies can be implemented.

Network survivability mechanisms can be developed in a vertical hierarchy at multiple layers within modern networks. Recovery granularity of recovery operations at different layers with a network is a key objective for network service providers to achieve network survivability. The concepts and technologies disclosed herein provide a multi-tier fault-tolerant network topology design that combines physical layer network connectivity robustness to enable rapid 100% recovery for important network locations/transmissions and network layer routing schemes to ensure sufficient bandwidth to allow acceptable levels of quality of service ("QoS") for low priority transmissions in highly dynamic situations.

The physical layer of a network, such as the optical layer (e.g., synchronous digital hierarchy/synchronous optical networking "SONET") in wavelength division multiplexing ("WDM") networks, is capable of providing dynamic ring and mesh restoration functionality. Protection at the physical layer can provide fast fault/failure detection. For example, in WDM networks, the loss of light or carrier signal at the optical layer can be detected quickly by the end node equipment. Protection at the physical layer also provides large switching granularity because the physical layer has the capacity to restore very large numbers of higher layer flows. For example, hundreds of label-switched paths ("LSPs") or asynchronous transfer mode ("ATM") virtual circuits ("VCs") that would ordinarily be affected by a single link failure (such as a fiber cut) could be restored simultaneously at the optical layer without the need to invoke higher layer signaling, which can be computationally expensive and slow since it may require processing by intermediate nodes and will invariably encounter propagation delay. These properties allow the physical layer to provide fast and full protections for the connections between important network users. The concepts and technologies disclosed herein provide pre-planned full protection on the physical layer for important network users. A challenge to provide this protection is to strike a balance between network resource efficiency and the simplicity of protection schemes. Moreover, the concepts and technologies disclosed herein can integrate QoS performance considerations with the protection schemes. A novel scheme named recovery trees will be used to construct a survivable physical network topology spanning high priority network users. The concepts and technologies described herein disclose how to integrate a fault-tolerant scheme with QoS performance considerations. The concepts and technologies disclosed herein also provide network robustness with QoS considerations, such as considerations of multiple link failures, reducing cost, and maximizing network bottleneck bandwidth.

Network service providers should consider recovery granularity when choosing a network survivability mechanism to implement. One drawback with physical layer protection is that the physical layer (such as the optical and SONET layers) can only recover full pipes. In other words, flows on a given link are recovered entirely or not at all (i.e., all-or-nothing). In many practical situations, however, it is helpful to be able to execute an application with reduced QoS as long as certain reliability is achieved. To find better granularity of protection, higher layers should be considered. For example, IP layers can recover individual packets or groups of packets. Rerouting at the network layer is used to restore service continuity in response to link and node outages.

As mentioned above, QoS granularity is a requirement for traffic engineering, and therefore QoS granularity also should be considered when choosing the network survivability mechanism. In a general sense, the higher the layer, the finer the QoS granularity available to the network service provider. An advantage of the network layer for implementing a survivability mechanism is the ability to find adaptive routes—implying that the IP layer runs routing algorithms that can be tuned to propagate information that facilitates the calculation of optimal routes through the network—to perform constraint-based routing, and as a result, to provide better granularity of protection. The IP layer, therefore, obtains a fine level of QoS granularity at which network protection can be done.

The network layer allows a path selection algorithm to pick paths based on priority and other requirements of the traffic to provide load balancing ability. At the IP layer, a network has the maximum flexibility to perform load sharing by distributing traffic across multiple paths (e.g., by hashing using the source and destination address), and the flexibility to select a better path if it becomes available. For connections that do not require 100% protection or fast recovery, the concepts and technologies disclosed herein provide a way to route the connections in a manner such that a link (or node failure) does not shut down the entire stream, but allows significant amount of traffic to continue to flow, thereby saving network resources.

The concepts and technologies disclosed herein also provide reliable adaptive multipath protection at the network layer. In particular, a topology is disclosed that allows the traffic of a single path to be split and routed along multiple (not necessarily disjoint) paths such that a single link failure does not affect more than X % of the total bandwidth. Thus, the disclosed topology creates a novel way to look at the bandwidth overbuild reliability tradeoff. A major challenge that network service providers face is how to split traffic to make sure that a given reliability can be readily achieved. More importantly, when traffic is routed over different physical paths, the traffic may incur different amounts of delay, and thus reach the destination at different times. This difference of delay over different physical paths is referred to as "differential delay." The presence of differential delay requires increased memory at the destination node to buffer the traffic until the data arrives from all paths, and consequently forces increased requirements for memory and bandwidth at the destination node in order to compensate for the differential delay. In turn, this potentially raises the node cost, making node deployments more expensive. For these reasons, it is desirable to handle differential delay as well as the reliability using multipath routing on the network layer.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for a multi-tier fault tolerant network design with QoS considerations will be described.

Turning now to FIG. 1, a block diagram illustrating aspects of a network environment 100 in which the concept and technologies disclosed herein can be implemented will be described. The illustrated network environment 100 includes a network service provider's network (hereinafter "network") 102. The network 102 can be or can include one or more access networks, one or more core networks, one or more backbone networks, or some combination of one or more of these networks and/or the like. In some embodiments, the network 102 utilizes WDM technology, dense WDM ("DWDM") technology, SONET technology, Ethernet technology, some combination thereof, and/or the like. While aspects of the concepts and technologies disclosed herein are described in context of the network 102 being implemented using any or a combination of the aforementioned technologies, those skilled in the art will appreciate the applicability of the concepts and technologies disclosed herein to other networking technologies. Accordingly, the concepts and technologies disclosed herein should not be construed as being limited to any particular networking technology.

The illustrated network 102 includes a plurality of sites 104A-104N (site$_1$ 104A, site$_2$ 104B . . . site$_N$ 104N; collectively, "sites 104"). Each of the sites 104 represents a geographical location within the network 102. Each of the illustrated sites 104 includes one or more nodes 106; in particular, in the illustrated example, the site$_1$ 104A includes node$_{1A}$ 106A-node$_{1N}$ 106N; the site$_2$ 104B includes node$_{2A}$ 106A'-node$_{2N}$ 106N'; and site$_N$ 104N includes node$_{NA}$ 106A''-node$_{NN}$ 106N''. Each of the nodes 106 can be or can include one or more routers, one or more switches, one or more connection points, one or more redistribution points, one or more endpoints, the like, or some combination thereof.

Figure 2:
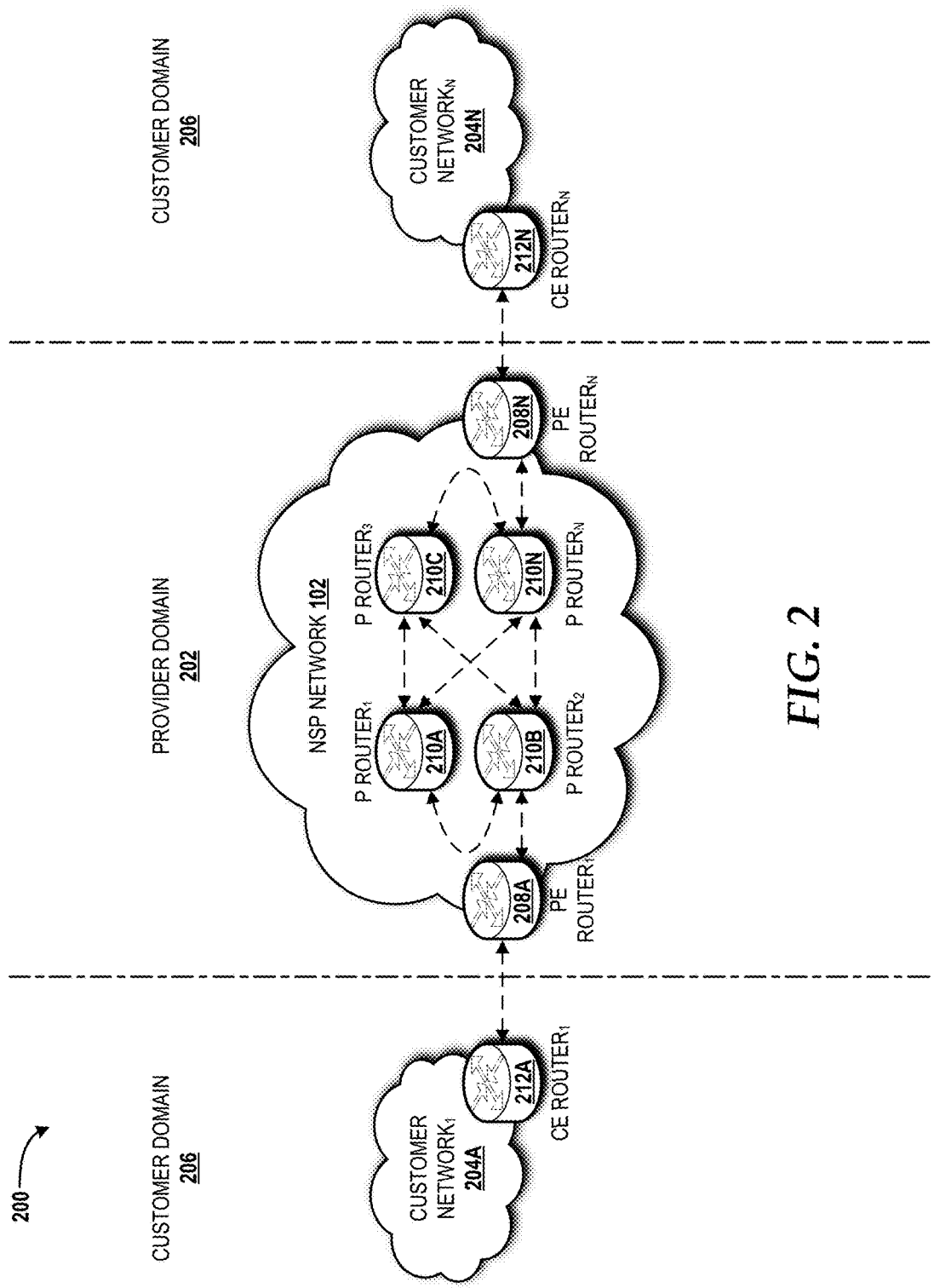
FIG. 2 is a block diagram illustrating an expanded network environment in which aspects of the concepts and technologies can be implemented.

Turning now to FIG. 2, a block diagram illustrating aspects of an expanded network environment 200 in which the concepts and technologies disclosed herein can be implemented will be described. The expanded network environment 200 includes the network 102 introduced above in FIG. 1 operating as part of a provider domain 202 and customer networks 204A-204N operating as part of a customer domain 206. The network 102 includes a plurality of nodes 106 as explained above with reference to FIG. 1. In the illustrated example, the nodes 106 are embodied as provider edge ("PE") routers 208A-208N and provider ("P") routers 210A-210N (also known as backbone routers). The illustrated PE routers 208A-208N are located at edges of the network 102 and provide connectivity between the provider domain 202 and the customer domain 206 via one or more customer edge ("CE") routers 212A-212N, respectively.

An aspect of the concepts and technologies disclosed herein provides physical layer protection for the physical layer of the network 102. An objective of physical layer protection is to ensure that the physical layer of the network 102 remains connected in the event of a physical link and/or node failure. Hardware redundancy is often relied upon to provide physical layer protection, but this solution is expensive, often prohibitively so, and often difficult to implement into existing network infrastructure. The concepts and technologies disclosed herein provide physical layer protection at reduced costs while still providing quality protection.

Figure 3A:
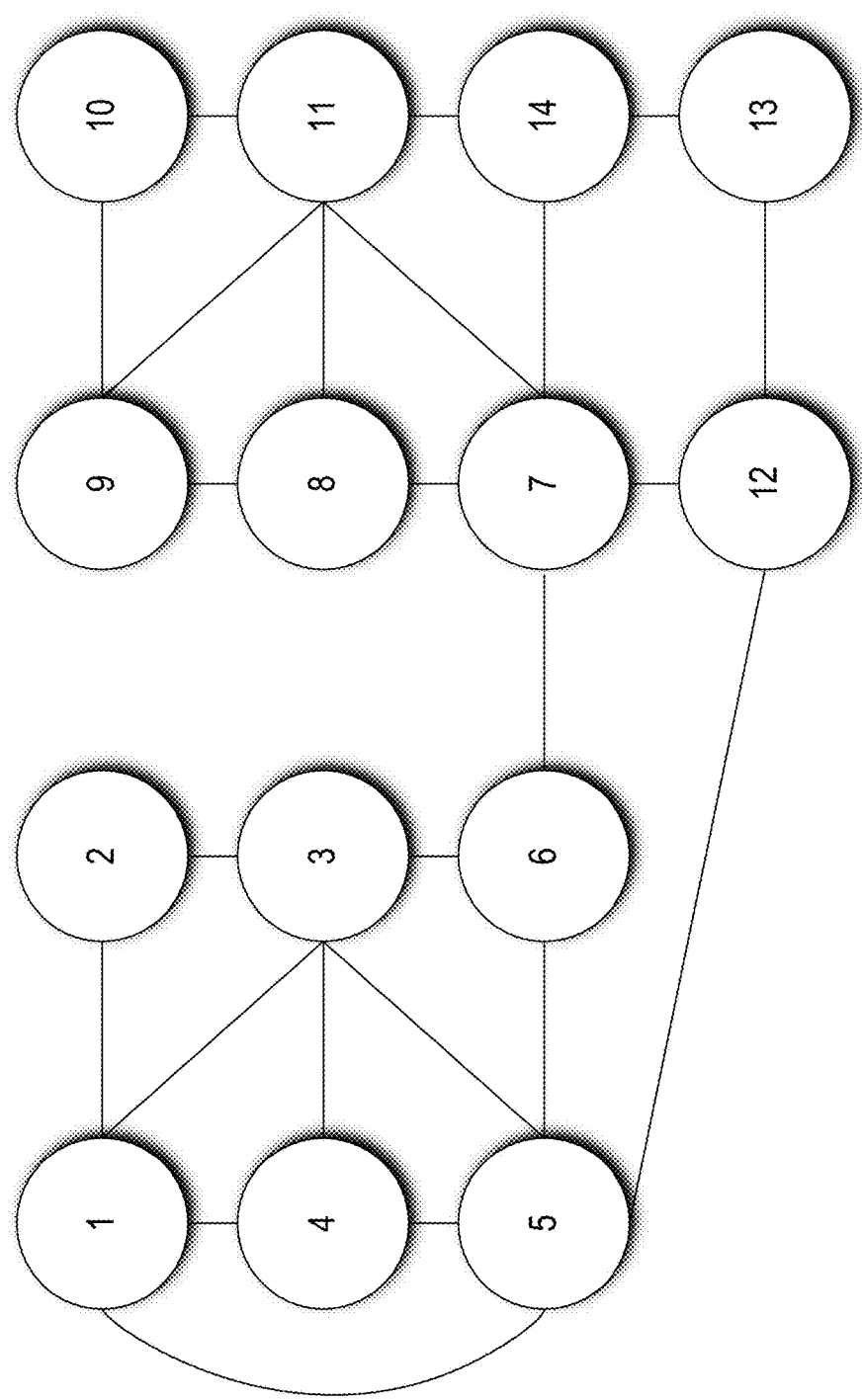
FIGS. 3A-3B are graphs illustrating preplanned recovery trees protection.
Figure 3B:
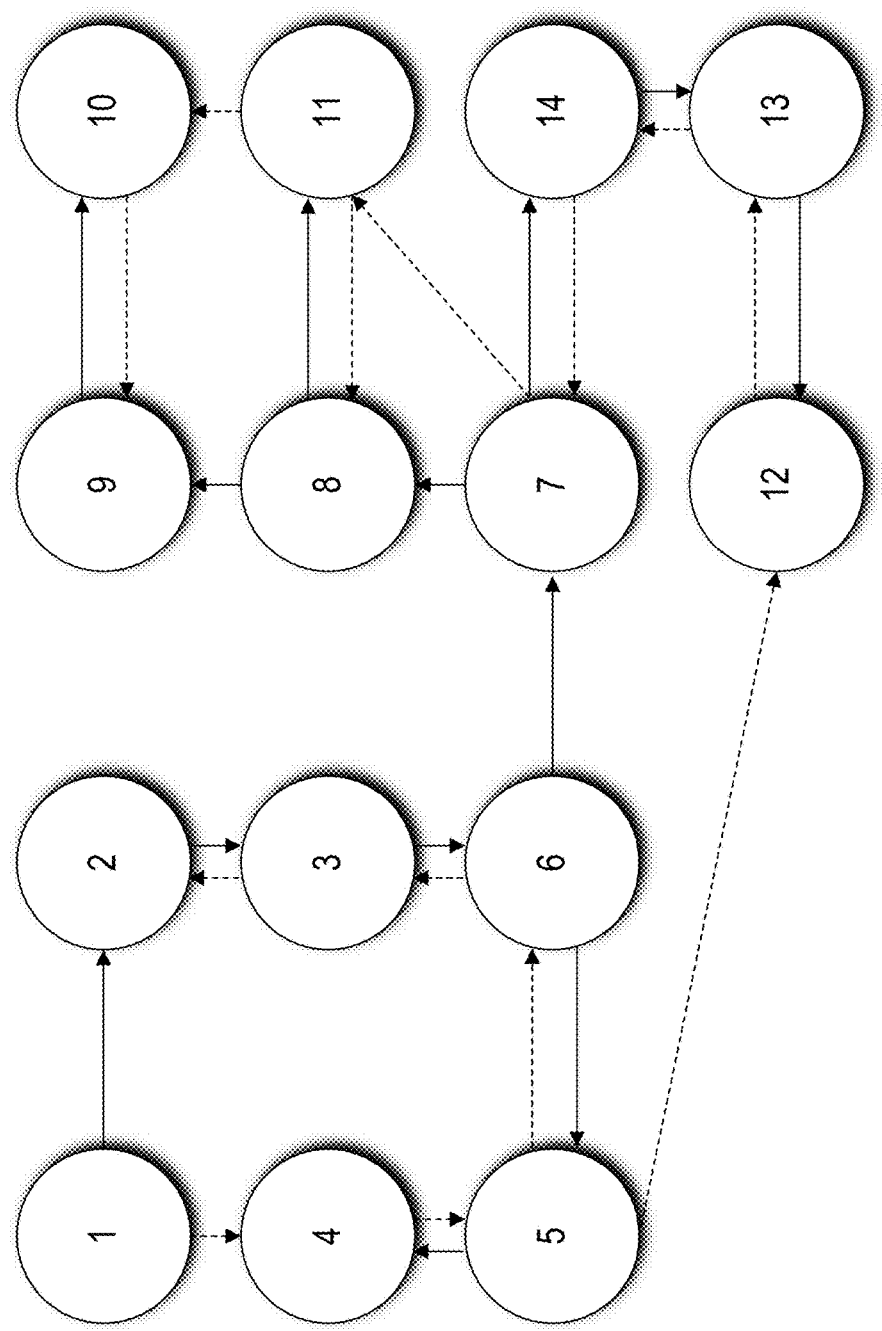

Turning now to FIG. 3A, a graph illustrating a 2-edge connected network will be described. The 2-edge connected network includes nodes 1-13 and links (illustrated as solid lines) connecting the nodes. The 2-edge connected network remains connected if a single link fails. For example, in consideration of an arbitrary node—node 1—as the central (i.e., root) node, two recovery trees (shown in FIG. 3B) can be constructed. In particular, FIG. 3B is a graph illustrating a first recovery tree (solid lines) and a second recovery tree (dashed lines), wherein the directional arrows show the recovery routes from the central node (i.e., node 1). Before any node or link failure, each node in the 2-edge connected network is connected to the central node on both trees. When a failure occurs, such as a failure of the link connecting nodes 3 and 6, nodes {5, 6, 7, 8, 9, 10, 11, 12, 13, 14} (i.e., the nodes operating downstream from (3, 6) in the solid tree) are disconnected from node 1 in the solid tree, and nodes {3, 2} (i.e., the nodes downstream from (6, 3) in the dashed tree) are disconnected from node 1 in the dashed tree. In this particular design, it can be guaranteed that those two sets of nodes are always disjointed. Therefore, if the solid tree is used as the working tree and the dashed tree is used as the backup tree, the nodes {5, 6, 7, 8, 9, 10, 11, 12, 13, 14} can communicate with the root node on the dashed tree after the failure of the specified link. It should be understood that two spanning trees can provide full protection for all nodes in a given network, such as the network 102. This concept is more resource efficient than previous path protection schemes.

Several schemes have been designed to provide protection against single link failure or single node failure in the physical network. It should be noted that some of these protection schemes for single failure recovery can actually provide guaranteed protection against multiple simultaneous failures as long as these failures satisfy a certain pattern. The Quality of Protection ("QoP") of a scheme is defined as the maximum number of simultaneous failures that can be protected by the scheme. In other words, if the QoP of a scheme is equal to k, then there exists an instance of k simultaneous failures that can be protected by the scheme. Clearly, protection schemes with higher QoPs are more desirable than protection schemes with lower QoPs.

Figure 4A:
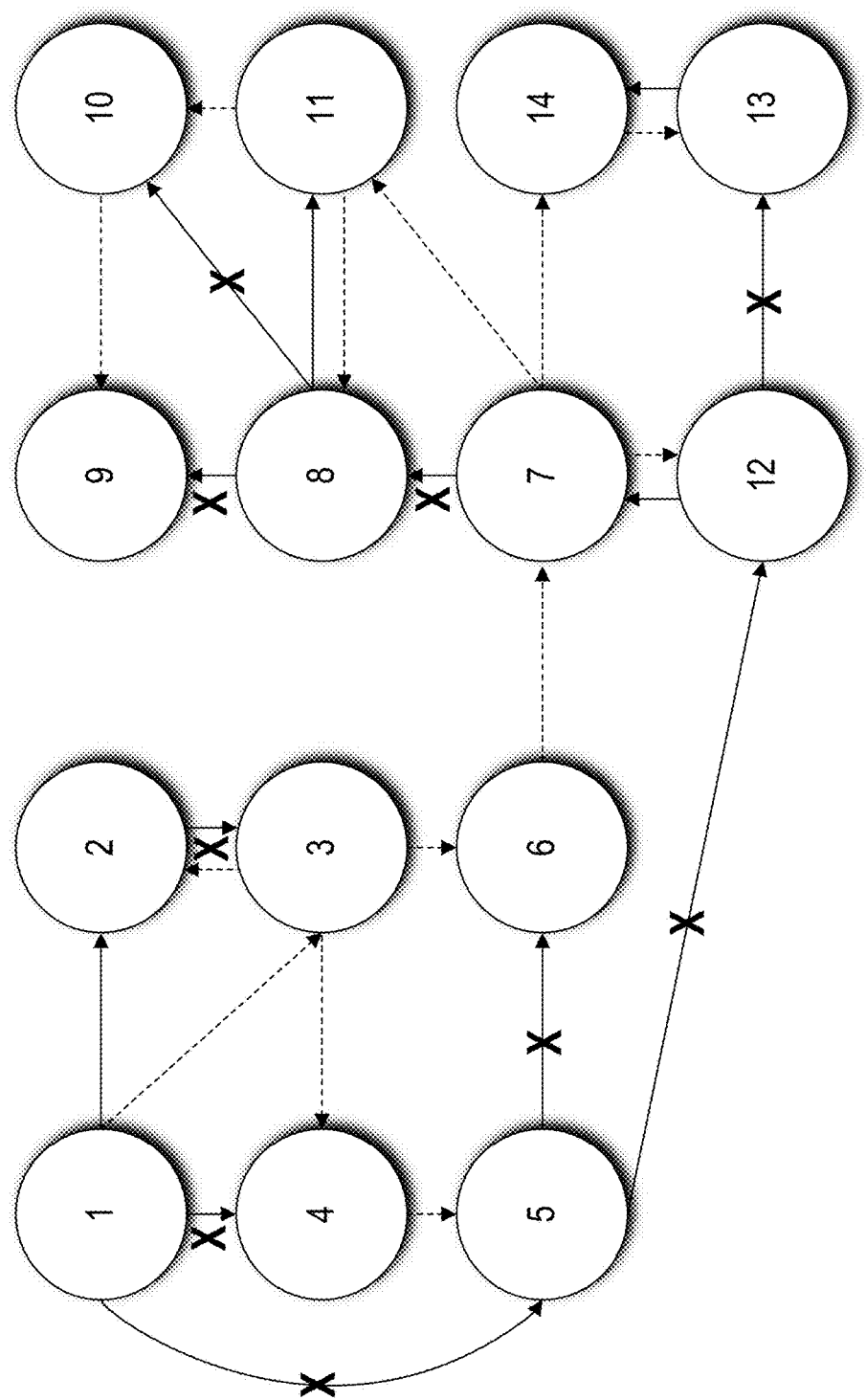
FIG. 4A is a graph illustrating an example recovery tree that provides a high quality of protection ("QoP").
Figure 4B:
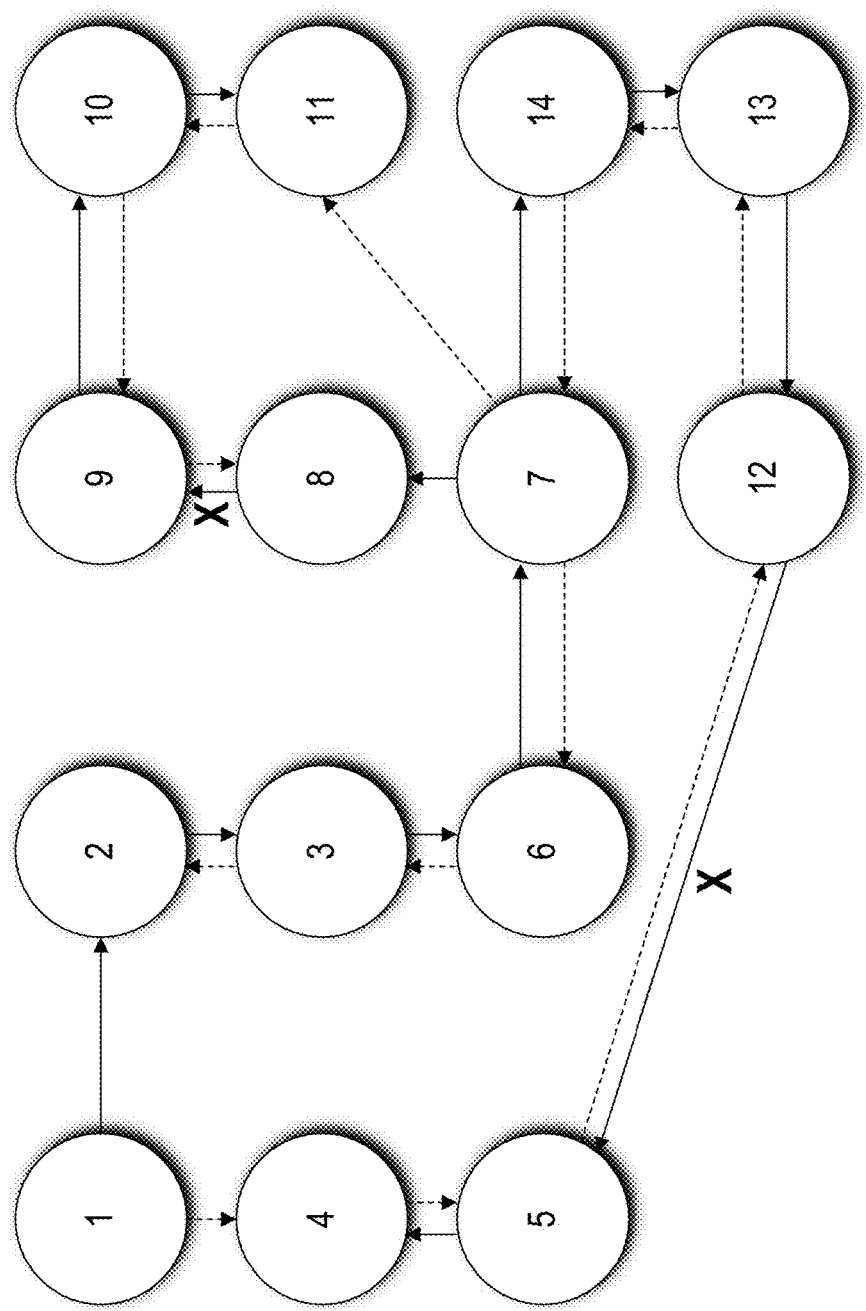
FIG. 4B is a graph illustrating an example recovery tree that provides a low QoP.

FIG. 4A is a diagram illustrating a pair of recovery trees obtained from an ear decomposition with nine ears. The pair of trees in FIG. 4A can protect against multiple link failures, as long as each ear has at most one failed link. FIG. 4A also shows that the pair of recovery trees can protect against nine simultaneous link failures (illustrated with an X on a failed link). FIG. 4B is a diagram illustrating another pair of recovery trees that has only two ears. Since there are only two ears, FIG. 4B shows that the pair of recovery trees can protect against two simultaneous link failures (illustrated with an X on a failed link). However, this pair of trees cannot protect against more than two link failures. The ear decomposition that has the maximum number of ears can produce a pair of solid/dashed trees that can protect the maximum number of simultaneous link failures. If the design goal is to maximize the QoP of the scheme, the maximum number of ears is used. For an ear decomposition with k ears and a set of simultaneous link/node failures $\{f_1, f_2, \ldots, f_k\}$, the failures can be reordered such that $f_i$ belongs to the ith ear but not the (i−1)st ear. As a result, the corresponding single failure recovery trees can survive all k failures as long as the failed node is not an articulation point of the network.

Figure 5A:
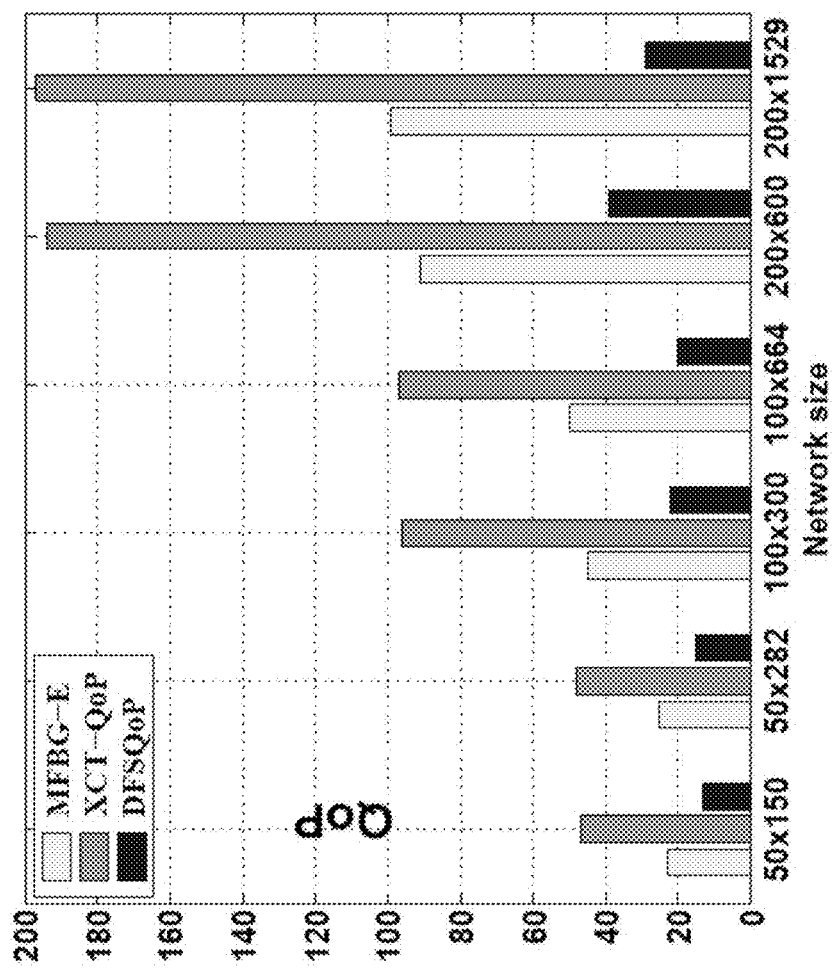
FIG. 5A is a graph illustrating a comparison of QoP provided by some previous recovery schemes.
Figure 5B:
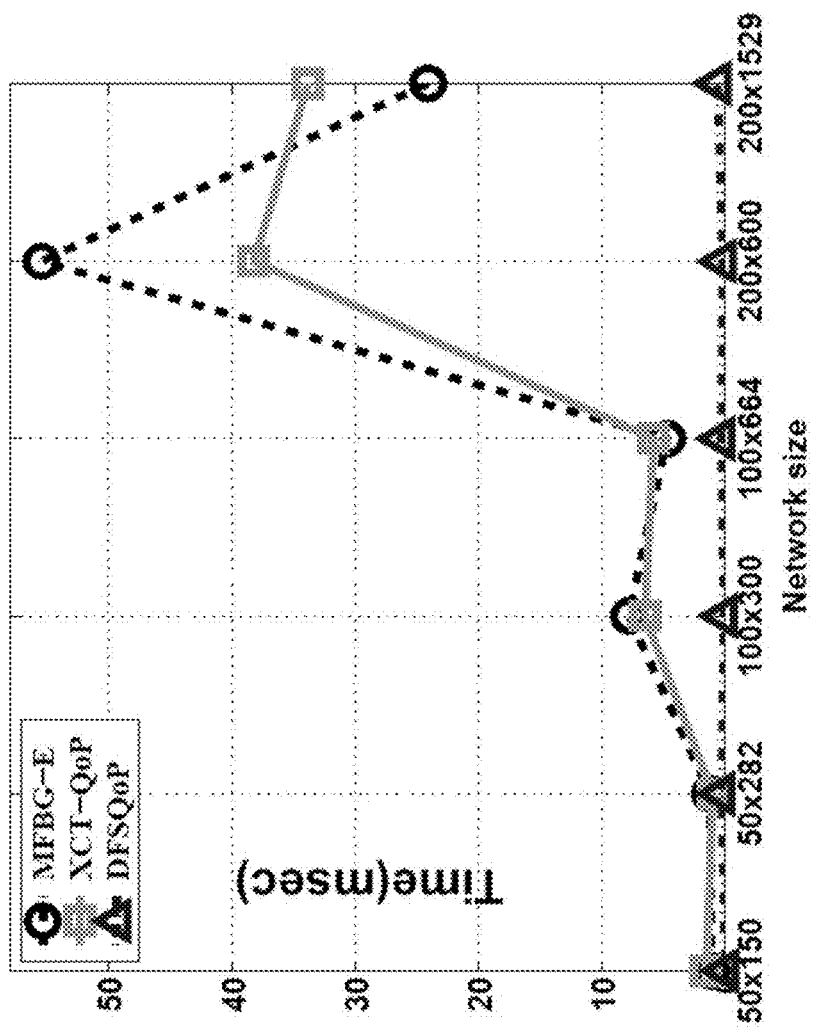
FIG. 5B is a graph illustrating a comparison of running times of some previous recovery schemes.

Turning now to FIGS. 5A and 5B, graphs illustrating a comparison of QoP (FIG. 5A) and running times (FIG. 5B) of different protection schemes will be described. In particular, the graph illustrates a comparison of an MFBG-E scheme, an XCT-QoP scheme (to maximize QoP), and a depth first search ("DFS") QoP scheme (to maximize running time performance—best shown in FIG. 5A). The MFBG-E scheme represents an algorithm provided by a group of researchers from Massachusetts Institute of Technology ("MIT") for constructing redundant trees over any edge or node-redundant network. The XCT-QoP scheme represents an algorithm for constructing a pair of recovery trees for maximizing QoP. The DFS QoP scheme represents a linear-time algorithm for traversing tree or graph data. As shown, XCT-QoP always provides the best QoP performance (see FIG. 5A) at the expense of longer run times (see FIG. 5B) compared to the DFSQoP scheme in the construction of recovery trees. With fast developments of networks, network topologies could change often. For this reason, the switching time to find a new pair of recovery trees is crucial and typically requires no more than 50 milliseconds. XCT-QoP clearly takes too much time to construct recovery trees. On the other hand, though DFSQoP runs fast, this scheme does not provide any QoP to improve robustness. MFBG-E has a running time similar to XCT-QoP, but with much less QoP. A goal of the concepts and technologies disclosed herein is to find a pair of recovery trees with good robustness (in terms of QoP) rapidly (in terms of running time).

The concepts and technologies disclosed herein provide enhanced QoP with faster running time than existing schemes such as those described above. According to embodiments, the scheme disclosed herein can be based upon the DFS technique. The DFS number of v, denoted by D[v], indicates the order that node v is visited during a depth first search. A DFS tree assigns a unique direction to each edge in G and classifies these directed edges into tree edges, which are in the DFS tree, and back edges, which are not in the DFS tree. If (u, v) is a directed edge in the DFS tree T, then u is called a parent of v, and v is called a child of u. Node x is called an ancestor of node y (y is called a descendant of x) if there is a directed path from x toy in T.

Figure 6A:
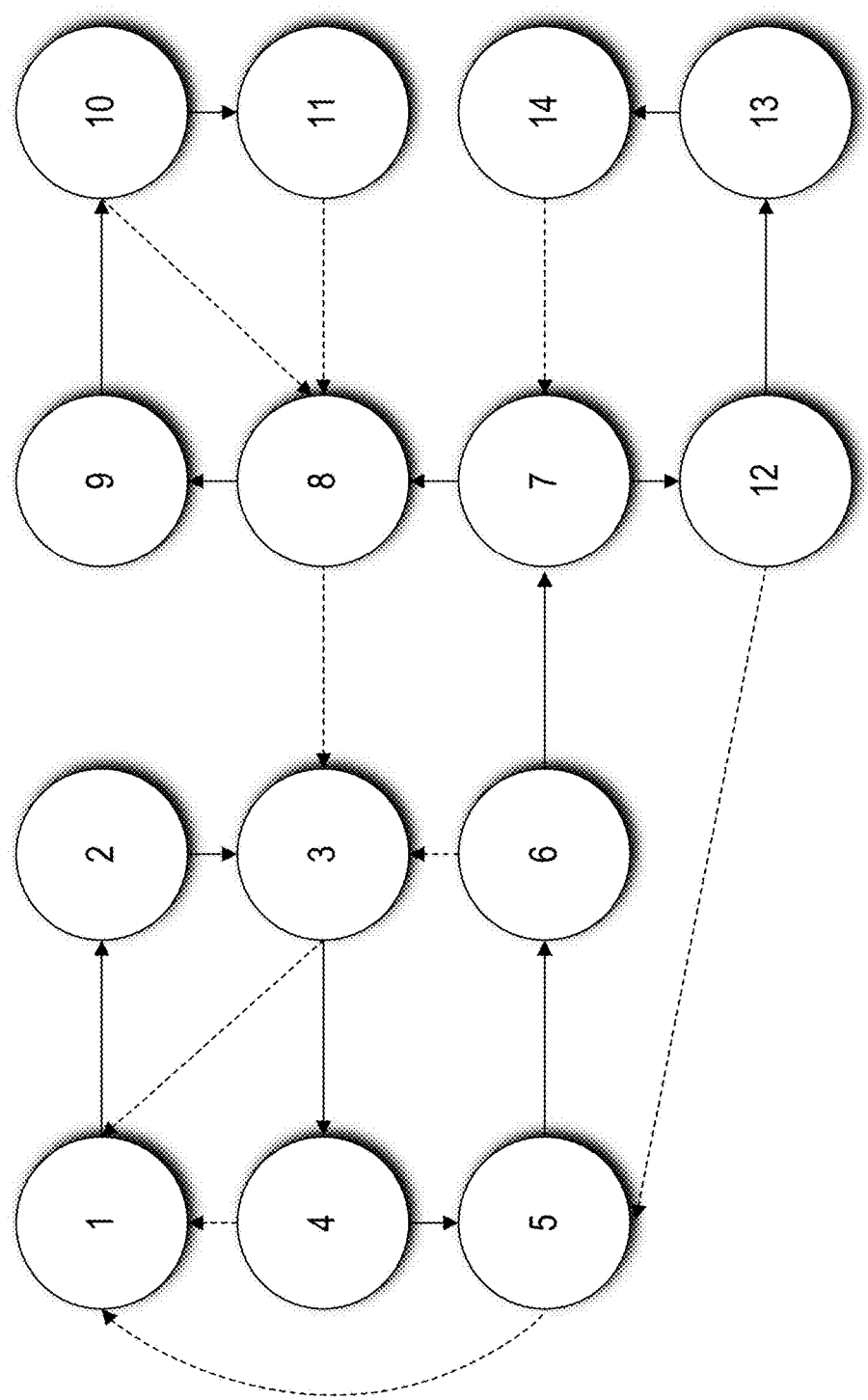
FIG. 6A is a graph illustrating an example depth first search ("DFS") tree used to enhance QoP for a network.

FIG. 6A shows a DFS tree T of a graph G whose edge set can be obtained by ignoring the directions of both the solid edges and the dashed edges. The solid links represent tree edges and the dashed links represent back edges. An "acceptable back edge" is utilized in construction of recovery trees in accordance with the scheme disclosed herein. In particular, given a DFS tree T of graph G, together with a pair of current recovery trees $T^R$ and $T^B$ spanning a subset of the nodes (including the root node s), a back edge (u, w) of T is called an acceptable back edge with respect to $T^R$ and $T^B$, if node u is not on $T^R$ and $T^B$ while node w is on both $T^R$ and $T^B$. If (u, w) is an acceptable back edge, then both $T^R$ and $T^B$ contain node w, but not node u. Let v be the nearest ancestor of u (on the DFS tree T) that is on both $T^R$ and $T^B$, then the tree path from v to u, concatenated with the back edge (u, w) forms a path (or cycle, in case v=w) connecting nodes v and w via nodes not yet on $T^R$ and $T^B$. This enables construction of a pair of recovery trees efficiently. In FIG. 6A, suppose only the root node 1 is on the current recovery trees, then back edges (3, 1), (4, 1) and (5, 1) are the only acceptable back edges.

It should be understood that the concepts of acceptable back edge and maximal back edge rely on the current $T^B$ and $T^R$. It is possible for a back edge that is not acceptable at a point in time to become acceptable later. For example, if node 3 had been added onto the current $T^B$ and $T^R$, then back edges (6, 3) and (8, 3) would become acceptable back edges. If (u, v) is a back edge, it is considered an outgoing back edge of node u, and an incoming back edge of node v.

The QoP of a pair of recovery trees is the same as the number of ears in the corresponding closed-ear decomposition of the sub-graph of G induced by the pair of recovery trees. Consequently, it is desirable to use more ears in the construction of the recovery trees if QoP performance is a priority. A design goal of the disclosed recovery scheme is to construct a pair of recovery trees efficiently. Another design goal is to construct the pair of recovery trees using as many ears as possible. As explained above, the pair of recovery trees $T^R$ and $T^B$ can be constructed by adding ears that correspond to acceptable back edges. There are two advantages to this approach. First, by finding ears starting from an acceptable back edge the pair of recovery trees can be constructed in linear time, which is asymptotically optimal. Second, by adding an ear whenever an acceptable back edge is observed, a pair of recovery trees can be constructed using relatively more ears. Therefore, the pair of recovery trees so constructed should have high QoP.

The recovery scheme starts with $T^R$ and $T^B$ initialized to contain the root node s only. A node is marked when it is visited to ensure linear time complexity. The scheme uses a queue markedQ to hold marked nodes that are not processed. The scheme uses a stack markedS to insert the marked nodes into markedQ in a desired order. Initially, only the root node s is marked and inserted into the queue markedQ. With the exception of node s, all other nodes that are in markedQ are candidate nodes to be added to the current $T^R$ and $T^B$, but are not on the current $T^R$ and $T^B$ yet. Once it is determined that (w, u) is a back edge and w is not marked, w is marked along with all of its unmarked ancestors and these nodes are added to markedQ in reverse order with the help of stack markedS. Starting from an acceptable back edge (u, w), where u is the marked node that has just been deleted from markedQ, the scheme adds the ear formed by the tree path from v to u, followed by the back edge (u, w), where v is the nearest ancestor of u that is already on the current $T^R$ and $T^B$. The process continues until all nodes are added to $T^R$ and $T^B$. This concept is illustrated with the examples shown in FIGS. 6A and 6B.

Figure 6B:
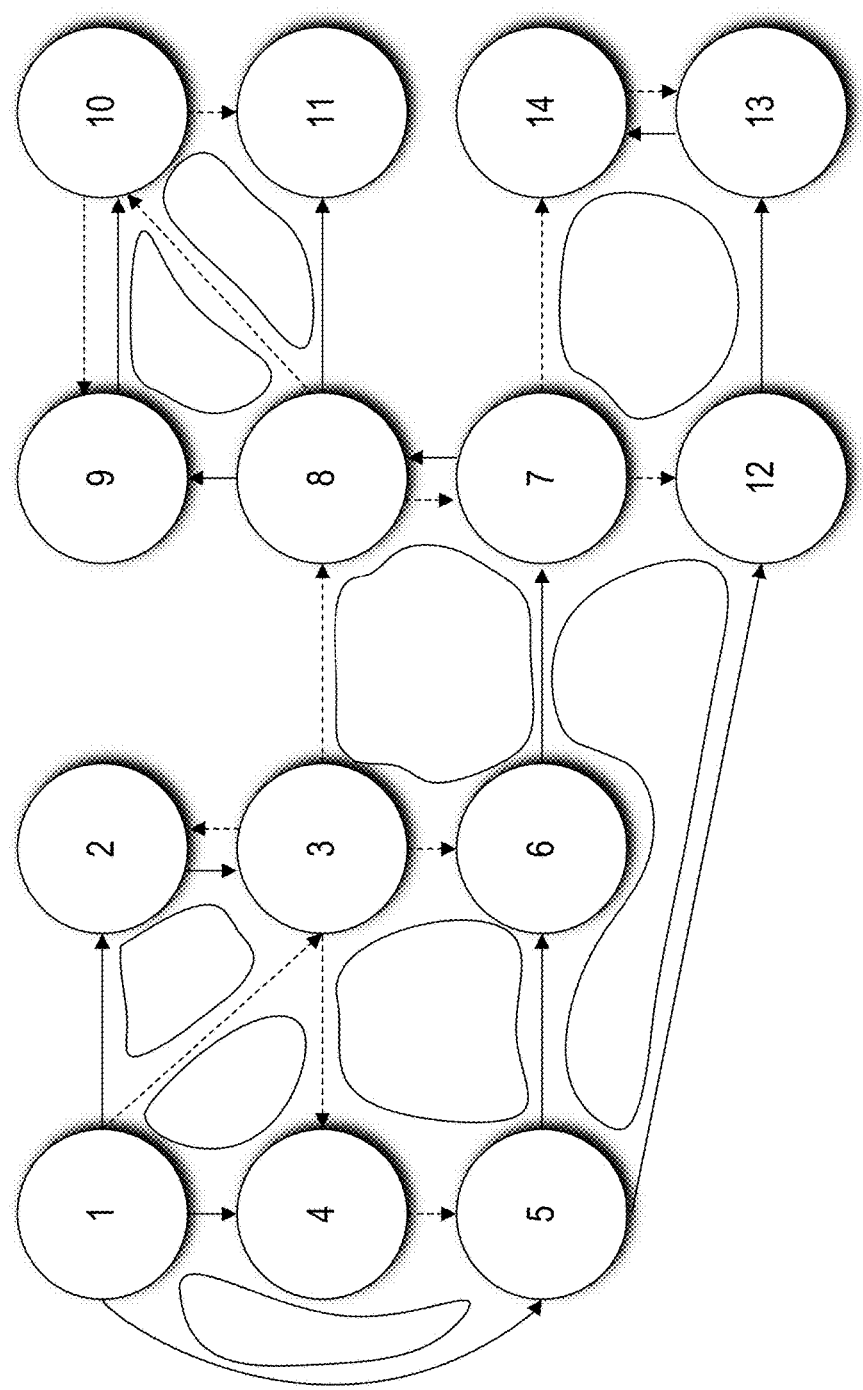
FIG. 6B is a graph illustrating an example recovery tree used to enhance QoP for a network.
Figure 7A:
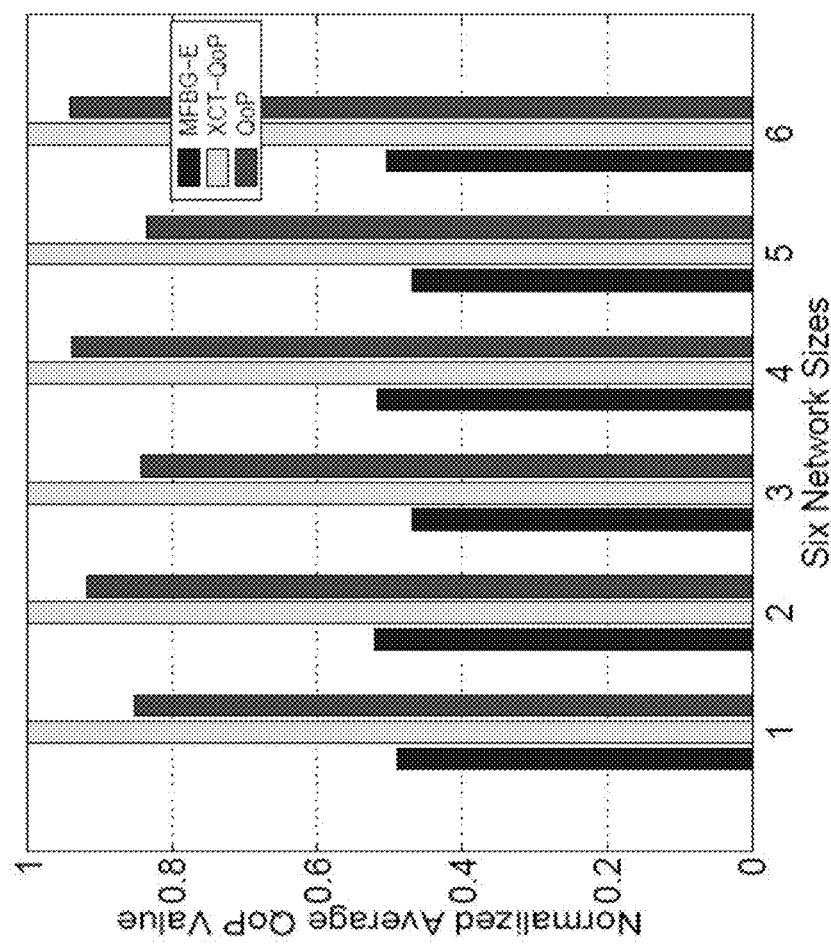
FIG. 7A is a graph comparing normalized QoP values for some previous recovery schemes and a recovery scheme disclosed herein.
Figure 7B:
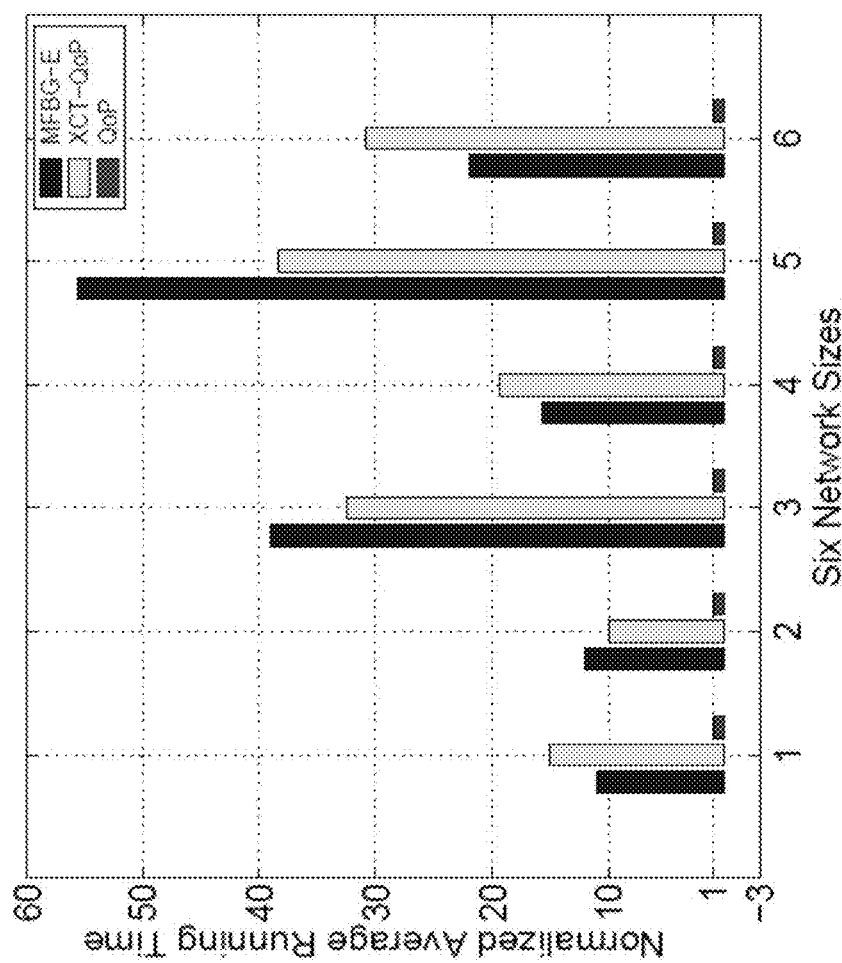
FIG. 7B is a graph comparing running times for some previous recovery schemes and a recovery scheme disclosed herein.
Figure 8A:
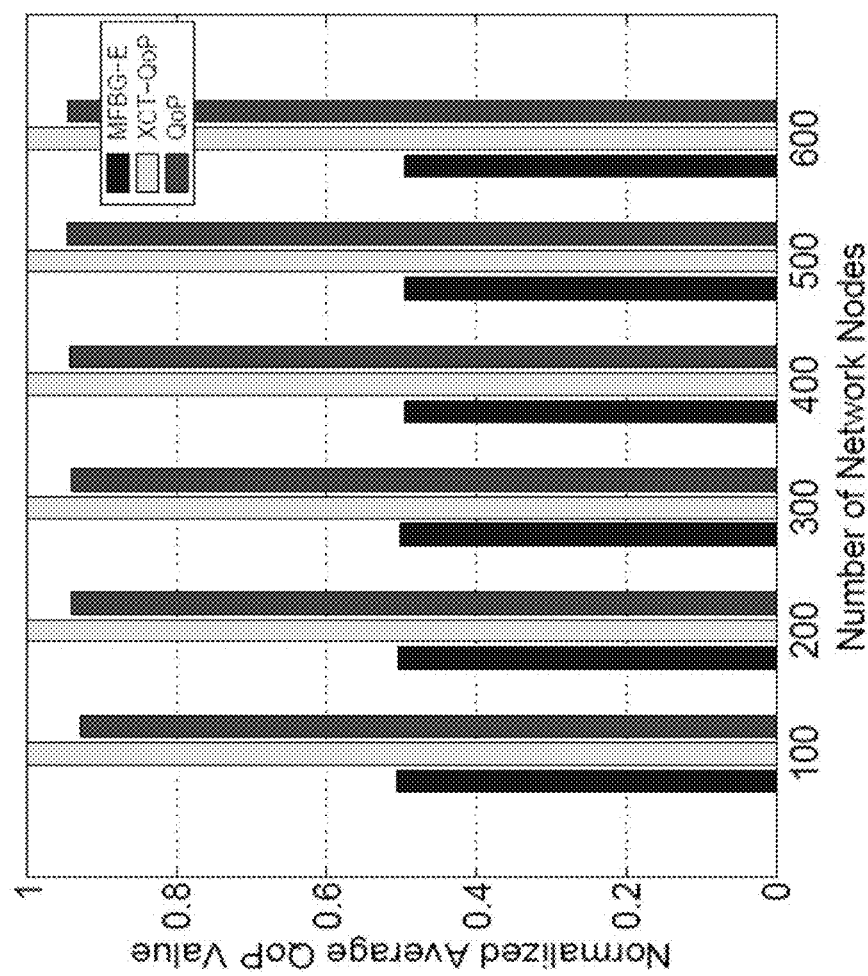
FIG. 8A is another graph comparing normalized QoP values for some previous recovery schemes and a recovery scheme disclosed herein.
Figure 8B:
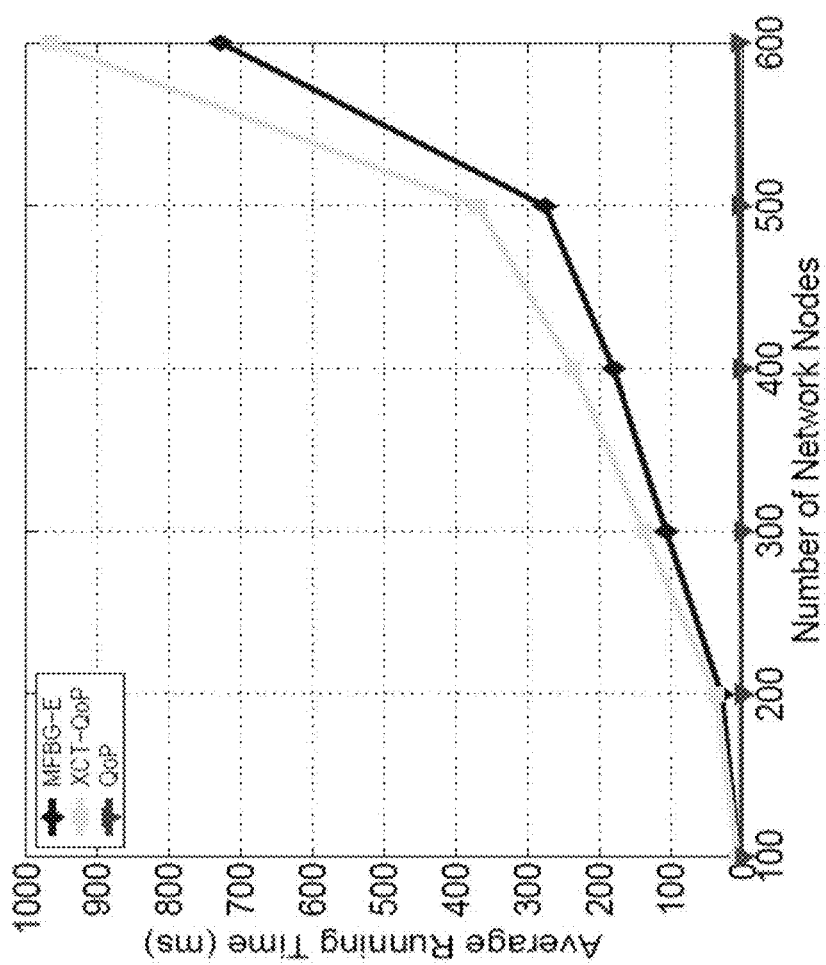
FIG. 8B is another graph comparing running times for some previous recovery schemes and a recovery scheme disclosed herein.

Turning first to FIG. 6A, a DFS tree is constructed with node 1 set as the root node. Node 1 is marked and inserted into $T^B$ and $T^R$. Next, all adjacent nodes of node 1 are checked, and as a result, three incoming back edges (3, 1), (4, 1) and (5, 1) are found. While processing back edge (3, 1), it is determined that node 3 is not yet marked. In response, node 3 is marked and pushed onto stack markedS. Then, node 2, being node 3's parent node, will be marked and pushed onto markedS. Since node 2's parent node, node 1, has been marked, no additional nodes are marked, and nodes 2 and 3 are extracted from markedS and inserted into queue markedQ in that order. Next, back edges (4, 1) and (5, 1) are processed and nodes 4 and 5 are marked and inserted into markedQ. At this point, the ordered nodes in markedQ are {2, 3, 4, and 5} (marking step finishes). Next, node 2 is processed; that is, the first node de-queued from markedQ. Node 2 has neither incoming back edges nor outgoing back edges incident therewith. Therefore, node 2 is skipped and node 3 is processed, which has an outgoing acceptable back edge (3, 1) going back to the current $T^B$ and $T^R$. Then a new cycle is to be added. From node 1, node 3 is added into the new cycle through the acceptable back edge. Then node 2, as node 3's parent node, is added. The parent node of node 2 is node 1, which is already on the current $T^B$ and $T^R$. Thus, the first cycle includes nodes 1, 2, 3, and 1. Nodes 2 and 3 are inserted into the recovery trees, edges (1, 2) and (2, 3) are added to $T^B$, edges (1, 3) and (3, 2) are added to $T^R$, and assigned a voltage to each newly-added node according to a voltage rule. The voltage rule guarantees that network traffic will always flow from the nodes with higher voltage to the ones with lower voltage. Meanwhile, node 3 has incoming back edges (6, 3), (8, 3) incident therewith. Thus, nodes 6, 7, and 8 will be marked and inserted into markedQ. Operations on node 3 are now complete. MarkedQ now includes nodes 4, 5, 6, 7, and 8. The next node de-queued is 4. Node 4 has an outgoing acceptable back edge (4, 1) incident therewith. A new path starting from node 1 is to be added. Node 4 will be added into the new path from node 1 through the acceptable back edge. Node 4's parent node 3 is on the current $T^B$ and $T^R$. Thus, a path (1, 4, 3) is created. Node 4 is then inserted into the current recovery trees, (1, 4) is added to $T^B$, and (3, 4) is added to $T^R$. Then, a voltage is added to node 4. Following in this manner, $T^R$ and $T^B$ are created as shown in FIG. 6B, where solid edges are on $T^B$ and dashed edges are on $T^R$.

Turning now to FIGS. 7A, 7B and 8A, 8B, graphs showing example results of an implementation of the aforementioned recovery scheme (denoted by QoP), an algorithm for single link failure recovery (denoted by MFBG-E), and an algorithm for enhancing QoP (denoted by XCT-QoP) will be described. Here it can be observed that the results are very similar in FIGS. 7A, 7B and 8A, 8B. That is, the disclosed recovery scheme (QoP) is significantly faster than MFBG-E and XCT-QoP, while having QoP performance comparable to that of XCT-QoP. Moreover, it can be observed from FIG. 7B that QoP has running times almost linear in n, while the other algorithms all have running times that grow much faster with n. This confirms the scalability of the disclosed recovery scheme. In other words, the numerical results show that the running time of the disclosed recovery scheme increases almost linearly with network size.

Another aspect of the concepts and technologies disclosed herein provides QoP enhancement for node failure protection. Node failure is a type of failure that can occur with a single network node. The reasons for this kind of failure can include, for example, accidents or disasters at a network operational center ("NOC"), such as power shutdown due to fire, flooding, or the like. Node failure is a rare event compared to link failure. The consequences of a node failure, however, are much more serious. For example, a node failure can interrupt all the service flows that go through the node as well as all the local traffic that is collected and distributed by the node. A node failure can lead all the communications of an area or a city to be totally isolated from the rest of the world. In addition to providing a solution for recovery from link failure as described above, the concepts and technologies disclosed herein can find fast efficient and robust protections for node failures using recovery trees. The basic concept is similar to the link protection concept described above, but differs because node protection does not allow adding a cycle onto the current $T^B$ and $T^R$ except the first ear. To achieve this goal, instead of checking incoming back edges to trigger a process of adding an ear onto the current $T^B$ and $T^R$, tree edges are checked to trigger such a process. The reason for the change is that it cannot be guaranteed that the ear triggered by checking a back edge is a path. Following the tree edges, however, it can be guaranteed that the end nodes of each ear are different, except for the first ear. The lowpoint number of node v, denoted by L[v], can be defined as the smaller of D[v] and the smallest/lowest DFS number of a vertex u that can be reached from v by a sequence of zero or more tree edges followed by a back edge. Starting from a node u, flow can proceed to a child node v of u and then follow a tree path concatenated with a back edge to reach an ancestor of u if and only if L[v]<u, which implies a path from u to the node associated with L[v].

Another aspect of the disclosed recovery scheme is the price reduction over existing schemes that rely upon hardware redundancy. The pair of trees in FIG. 4A uses only 16 links, while the pair of trees in FIG. 4B uses 22 links. Therefore, the pair of trees in FIG. 4A is less costly for single-link failure protection. The cost of the trees are measured by the number of edges used, and the concepts and technologies disclosed herein aim to provide linear time algorithms for constructing a pair of recovery trees with low total cost. Reducing cost and enhancing QoP differ in the following aspect. The goal of enhancing QoP is to have more ears in the ear decomposition while the goal of reducing cost is to have fewer ears in the ear decomposition. Recall that in the QoP solution an outgoing acceptable back edge triggers such an operation. Enhancing QoP adds an ear whenever an acceptable back edge is encountered. The idea of reducing cost adds an ear only when a maximal back edge is encountered. An acceptable back edge (u, w) is called a maximal back edge if it is impossible to reach a node on $T^R$ and $T^B$ from u by a sequence of one or more tree edges followed by a back edge. For each de-queued node u, only when it is necessary, for example, u has an incoming maximal back edge (w, u), the scheme adds a path/cycle. The path/cycle connects w's nearest ancestor on the current recovery trees with node u, onto $T^B$ and $T^R$. Since maximal back edges are used to add ears, and a maximal back edge is also an acceptable back edge, an analysis similar to that used in QoP is used to provide a linear time solution for reducing cost.

Another aspect of the disclosed recovery scheme is to provide protection with other QoS metrics. Besides cost, a pair of single failure recovery trees can be constructed in consideration of one or more QoS metrics, such as bandwidth and delay. A recovery scheme designed in consideration of bottleneck bandwidth of the network will now be described. In this recovery scheme, a fast algorithm is provided to construct a pair of single failure recovery trees with maximum bottleneck bandwidth. The concept here is to find the maximum bottleneck bandwidth, and then to apply a fast algorithm (designed for QoP or reduced cost) to construct the recovery trees of the subgraph obtained by removing the links whose bandwidths are smaller than the maximum bottleneck bandwidth. Therefore, it should be understood that the algorithms disclosed herein can construct a pair recovery trees with maximum bottleneck bandwidth as well as enhanced QoP or multiple QoS performances, which have not been addressed in the prior art. Similar concepts could be applied for fault tolerant design considering network delay.

Most previous protection and restoration schemes were designed for all-or-nothing protection, and thus, are overkill for data traffic. Most previous work in network management has focused on the two extremes—either best effort with no overprovisioning and no reliability or with 100% overhead for full protection from a single failure. While voice traffic generates constant bit rate traffic, data traffic is bursty giving the advantage that data applications can continue operation, possibly at a lowered performance, even if the capacity along a path is reduced. For example, a wide area enterprise storage network, while slowing down, can still function if failures reduce the underlying network capacity by 50%. In other words, unlike voice, which has a binary service up or down condition, data services can survive gradual degradation as the available bandwidth is reduced. In many practical situations, it can be helpful to execute an application with reduced QoS (e.g., a black-and-white video conference tool may still be very useful if there isn't sufficient bandwidth for full color video). For connections that do not require 100% protection or fast recovery, the connections can be routed in a manner such that link (or node) failure does not shut down the entire stream, but instead allows significant amount of traffic to still continue to flow, thereby saving network resources. The disclosed recovery scheme allows the traffic of a single path to be split and routed along multiple (not necessary disjoint) paths such that a single link failure does not affect more than X % of the total bandwidth.

To achieve multi-path routing, the source node partitions the data into several parts using coding theory and transmits each part along a different path. In this manner, all packets received from these paths are intercepted and stored in a buffer memory in the destination node in order to find out what is transmitted in the process. The ability to split and route traffic separately, however, introduces a unique problem. In particular, when traffic is routed over different physical paths, the traffic may incur different amounts of delay, and thus, reach the destination at different times. This difference of delay of paths is called "differential delay." The presence of differential delay requires increased memory in the destination node to buffer the traffic until the data arrives on all the paths, and consequently forces increased requirements for memory and bandwidth at the destination node in order to compensate for the transmission. In turn, this potentially raises the network element cost, making deployments more expensive. Moreover, in the worst-case scenario, buffer overflows can cause data corruption and bring down the service. Clearly, differential delay needs to be addressed in order to correctly re-construct the data at the destination. The concepts and technologies disclosed herein address this reliable adaptive multipath provisioning ("RAMP") problem with bandwidth and differential delay constraints.

The concepts and technologies disclosed herein model the network using a weighted directed graph G(V, E, b, d), where V is the set of n nodes, and E is the set of m links. Each link e=(u, v) ∈ E is associated with a bandwidth b(e)>0 and a delay d(e)≥0. Let s be a source node and t a destination node. A s–t path is a sequence of nodes $x_0, x_1, \ldots, x_l$ in V such that $x_0$=s, $x_l$=t, and $(x_{i-1}, x_i)$ is a link in E for i=1, 2, . . . , l. Let p be a s–t path, the bandwidth of path p is $$b(p) = \min_{e \in p} b(e)$$

and the delay of path p is $d(p) = \Sigma_{e \in p} b(e)$.

For "bandwidth allocation," let P be a set of s–t paths, where each path p∈P is associated with a bandwidth allocation L(p)≤b(p). L is a feasible bandwidth allocation of P if for each link e∈E, $\Sigma_{p \in P, e \in P} L(p) \leq b(e)$. The aggregated bandwidth of P, denoted by b(P), is the sum of all the bandwidth allocations of the paths in P: $b(P)=\Sigma_{p\in P} L(p)$.

For "differential delay," let P refers to a set of paths $p_1$, $p_2, \ldots, p_k$ for a node pair (s, t). The delay of P, denoted by d(P), is defined to be the delay of the longest path in P, i.e., $$d(P) = \max_{p\in P} L(p).$$

Let $d_h$ and $d_s$ be the delay of highest and smallest delay paths in P respectively, then differential delay $D_P$ of paths in defined as: $D_P=d_h-d_s$.

For the "RAMP Problem", let G=(V, E, b, d) be a weighted directed graph with node set V and link set E, where each link $e \in E$ is associated with a bandwidth b(e)>0 and a delay d(e)≥0. Let R be a new connection request with source node s, destination node t, bandwidth request B, reliability requirement x %, and differential delay requirements $d_{min}$ and $d_{max}$. The RAMP problem seeks a set of paths P such that:
1. The aggregated bandwidth of all paths in P is no less than B: b(P)≥B.
2. Route the data traffic such that any single link failure does not affect more than x % of the total bandwidth.
3. Any path p in P must satisfy the differential delay constraint: $d_{min} \le d(p) \le d_{max}$.

In the RAMP problem, a data service is served for connection requests adaptive to different reliability requirements. Network operators provide connections with service-level-agreement ("SLAs"), where an SLA is a contract documenting the availability guarantees. This reflects the case when the traffic is provisioned for the peak rate but the operator needs to ensure that the average rate, say 30% below the peak rate, is maintained even after failures. With different reliability requirements, such as no more than 60% loss of the total traffic in case of at most 2-link failure, the disclosed scheme can adaptively decide the bandwidth allocation on each link used for the traffic and provide reliable traffic. For example, if no more than X (=x %·B) on each link, then any single link failure can only affect x % of the total traffic (no matter how many paths are affected), and any two-link failure (no matter how many paths are affected) can only affect at most 2·x % of the total traffic.

Though RAMP provides adaptive and reliable transmissions, it is challenging to implement. It is NP-hard by outlining a reduction from Partition problem to RAMP. Partition is a well-known NP-hard problem that decides whether a given multi-set S of positive integers can be partitioned into two subsets, S1 and S2, such that the sum of the numbers in S1 equals the sum of the numbers in S2. An instance of Partition is given by a finite set A, where each a∈A is associated with a positive integer s(a), known as the size of a. Partition asks for the existence of a subset A' of A such that $\Sigma_{a\in A'}s(a)=\Sigma_{a\in A}s(a)$. This problem is known to be NP-hard.

Figure 9:
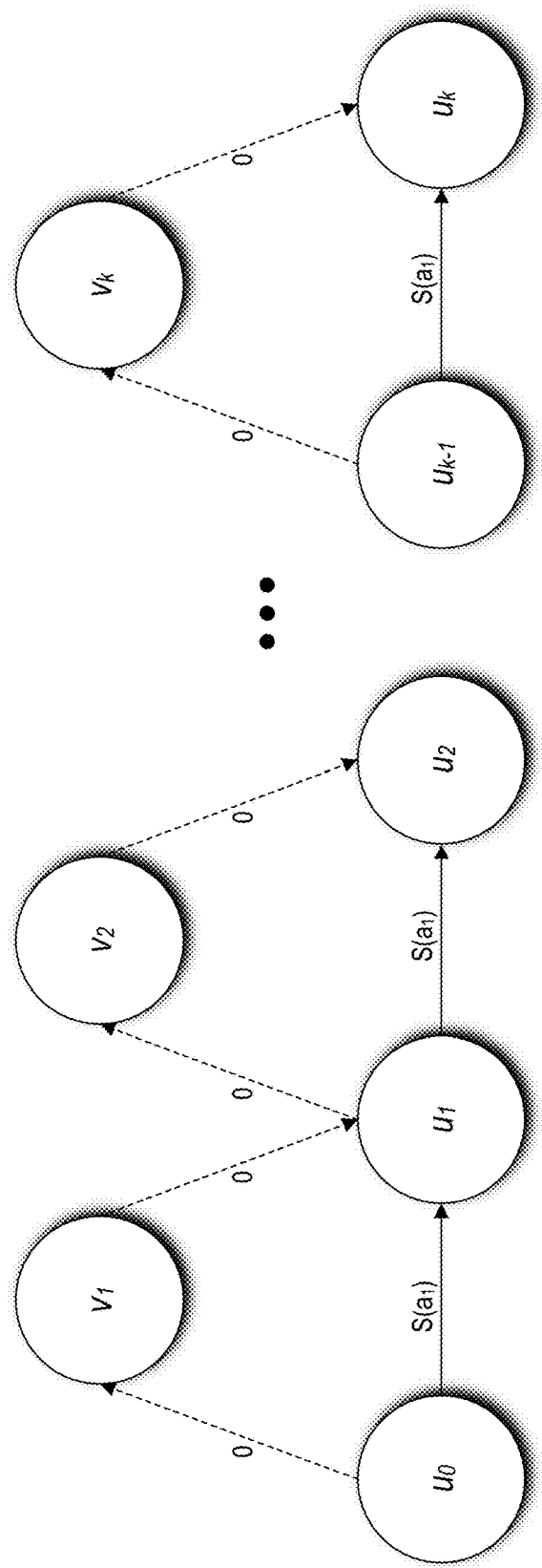
FIG. 9 is a graph illustrating a reduction from PARTITION to RAMP.

Turning now to FIG. 9, a reduction from Partition to RAMP will be described. Let an instance $I_1$ of Partition be given by $A=\{a_1, a_2, \ldots, a_k\}$ and size function s. An instance $I_2$ of RAMP can be constructed in the following way. The set of nodes of graph G(V, E) is given by V= $\{u_0, v_1, u_1, v_2, \ldots, u_{k-1}, v_k, u_k\}$. The set of directed links are $(u_{i-1}, u_i)$, where i=1, 2, . . . , k, with delay equal to s(ai) (marked by solid links in FIG. 9) and $(u_{i-1}, v_i)$ and $(v_i, u_i)$ (dashed links in FIG. 9) with a delay equal to 0, i=1, 2 . . . , k. All links have bandwidth equal to 1. The graph is shown in FIG. 9. Set $s=u_0$, $d=u_k$, B=2, x %=50%, $$d_{min} = d_{max} = \frac{\sum_{1\le i\le k} s(a_i)}{2}$$

the instance of RAMP. Clearly, $I_2$ can be constructed from $I_1$ in polynomial time. Suppose $I_1$ has a feasible partition A'⊆A such that $\Sigma_{a\in A'}s(a)=\Sigma_{a\in A/A'}s(a)$. Then in $I_2$, from $u_0$ to $u_k$, there are two paths $p_1$ and $p_2$ where one path, say $p_1$, uses the solid links corresponding to elements a∈A', and the other path $p_2$ uses the solid links corresponding to elements a∈A/A'. It can be seen that both paths provide bandwidth 1 and $d_{min}\le d(p_1)=d(p_2)\le d_{max}$. This provides a feasible solution for $I_2$.

Conversely, suppose $I_2$ has a feasible solution that provides two paths. Each path has a bandwidth of 1, and a path delay of $$\frac{\sum_{1\le i\le k} s(a_i)}{2}.$$

Let A' be the set of elements whose corresponding solid links are used by $p_1$. Then A' forms a feasible partition for $I_1$. This proves that RAMP is NP-hard.

Given the hardness of the problem, it is not possible to find a polynomial time optimal solution for RAMP unless P=N P. Therefore, a solution that utilizes polynomial time approximation schemes ("PTAS") or polynomial time approximation algorithms for RAMP is considered. To find an approximation solution for the RAMP problem, a special case of RAMP is introduced, where edge delays and differential delay bounds are integers.

For "Integer Reliable Adaptive Multipath Provisioning (TRAMP)," let G=(V, E, b, d) be a weighted directed graph with node set V and link set E, where each link e∈E is associated with a bandwidth b(e)>0 and a delay d(e)≥0. Moreover, on each link e, the edge delay, d(e), is assumed to be an integer. Let R be a new connection request with source node s, destination node t, bandwidth request B, reliability requirement x %, and integer differential delay requirements $d_{min}$ and $d_{max}$. The TRAMP problem seeks a set of paths P such that:
1. The aggregated path bandwidth b(P) is no less than B.
2. Any single link failure does not affect more than some x % of the total bandwidth.
3. Each path in P must satisfy the differential delay constraint.

The concepts and technologies disclosed herein provide a novel graph transformation technique, which is described in detail below. Let an instance of TRAMP be given by graph G(V, E), reliable requirement x %, bandwidth request B, differential delay bounds $d_{min}$ and $d_{max}$, and source-destination node pair (s, t). A layered graph $G^R=(V^R, E^R)$ from G in the following way.
1. Corresponding to each node u∈V, $V^R$ contains ($d_{max}+1$) nodes $u_{[0]}, u_{[1]}, \ldots, u_{[dmax]}$.
2. For each link (u, v) in G, $E^R$ contains $d_{max}-d(u, v)+1$ links in the form of $(u_{[i]}, v_{[i+d(u,v)]})$, i=0, 1, . . . , ($d_{max}-d(u, v)$).
3. $E^R$ also contains ($d_{max}-d_{min}$) links in the form of $(t_{[i]}, t_{[i+1]})$, $i=d_{min}, \ldots, d_{max}-1$. Each such a link has bandwidth ∞.

4. For all edges $(u_{[i]}, v_{[i+d(u,v)]})$ constructed in $E^R$ in step 2), if $b(u, v) \geq x\% \cdot B$, aggregated bandwidth of these edges is $x\% \cdot B$. Otherwise, aggregated bandwidth is $b(u, v)$ for these edges.

Figure 10A:
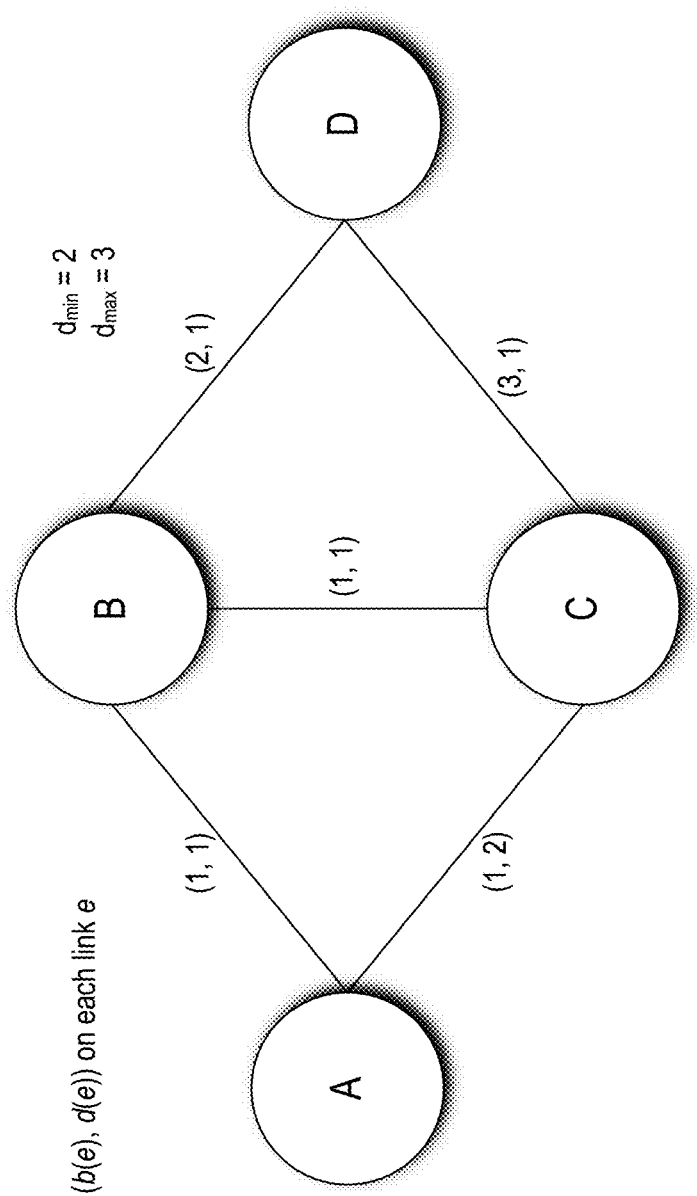
FIG. 10A is a graph illustrating an original graph prior to a transformation for IRAMP.

Each link $(u_{[i]}, v_{[i+d(u,v)]})$ in $G^R$ demonstrates the case that if at node u a path has delay i, and the path is extended by using link (u, v), then the path delay will be increased to i+d(u, v) when reaching node v. An example that demonstrates this graph transformation technique can be seen in FIGS. 10A, 10B. In FIG. 10A, an instance of IRAMP with s=A, t=D, B=2, x%=50%, $d_{min}$=2 and $d_{max}$=3 is presented. The corresponding layered graph $G^R$ is represented in FIG. 10B.

Since the reliability requirement is 50%, and the bandwidth request is 2, the bandwidth that can be allocated on each link in G is at most 1. Correspondingly, in FIG. 10B, all links in the form $(u_{[i]}, v_{[i+d(u,v)]})$, i=0, 1, ..., $(d_{max}-d(u, v))$ have an aggregated bandwidth of 1. For example, link (B, D) has bandwidth 2 in FIG. 10A, but only at most bandwidth 1 can be used for connection A–D. Thus, the corresponding links in $G^R$, $(B_{[0]}, D_{[1]})$, $(B_{[1]}, D_{[2]})$, $(B_{[2]}, D_{[3]})$, have aggregated bandwidth 1, shown in FIG. 10B.

It should be noted that the constructed graph $G^R$ is acyclic since for each link $(u_{[i]}, v_{[j]}) \in E^R$, it is always true that i<j. To find a solution for an instance of IRAMP from s to t in G, paths in $G^R$ are searched from $s_{[0]}$ to $t_{[dmax]}$. Note that any path $p^R$ from $s_{[0]}$ to $t_{[dmax]}$ guarantees that its delay is between $d_{min}$ and $d_{max}$. For any $p^R$, there is a corresponding path p from s to t in G whose delay is also bounded by $d_{min}$ and $d_{max}$. If the aggregated flow on links $(u_{[i]}, v_{[i+d(u,v)]})$, i=0, ..., $d_{max}-d(u, v)$ is no more than $x\% \cdot B$, link (u, v) has no more than $x\% \cdot B$ flow value on it in the corresponding s–t flow in G. With the maximum flow (whose value≥B) calculated by IRAMP, arc-chain decomposition can be used to generate paths, each of whose delay is bounded by $d_{min}$ and $d_{max}$ and bandwidth is no more than $x\% \cdot B$. For the example given in FIG. 10A, a flow is illustrated in FIG. 10B with thick links. It will be decomposed to two paths $p_1^R=(A_{[0]}, B_{[1]}, D_{[2]}, D_{[3]})$ (marked by solid links) and $p_2^R=(A_{[0]}, C_{[2]}, D_{[3]})$ (marked by dashed links), in the layered graph $G^R$. The solid path $p_1^R$ has corresponding path $p_1$=(A, B, D) in G with path delay 2. The dashed path $p_2^R$ as corresponding path $p_2$=(A, C, D) in G with path delay 1. Note that path $p_1$ has path delay smaller than $d_{max}$, due to the links $(D_{[2]}, D_{[3]})$.

To solve the RAMP, instead of studying the decision version of the problem, the concepts and technologies disclosed herein aim to study an optimization version of RAMP ("ORAMP"). For the ORAMP, let G=(V, E, b, d) be a weighted directed graph with node set V and link set E, where each link e ∈ E is associated with a bandwidth b(e)>0 and a delay d(e)≥0. Let R be a new connection request with source node s, destination node t, bandwidth request B, reliability requirement x %, and delay requirements $d_{min}$. The optimization version of the RAMP problem ORAMP seeks a set of s–t paths, P, together with a feasible bandwidth allocation L such that:

$$b(P) \geq B; \quad (1)$$

$$d_{min} \leq d(p) \leq D, \forall p \in P; \quad (2)$$

and $$\Sigma_{p \in P, e \in p} L(p) \leq \min\{b(e), x\% \cdot B\}, \forall e \in E \quad (3)$$

Since ORAMP is NP-hard, only an approximation scheme or algorithm for the ORAMP problem can be determined. As an initial attempt, a special case of ORAMP (denoted by SPRAMP) is reviewed, where $d_{min}$=0. It can be seen that if there is no feasible solution for an instance of SPRAMP(G, s, t, x, B), then there is no feasible solution for the instance ORAMP(G, s, t, x, B, $d_{min}$). A fully polynomial time approximation scheme ("FPTAS") can be used for this special case. The basic concept is based on a scaling and rounding technique. For a given positive real number θ and an instance SPRAMP(G, s, t, x, B), an auxiliary graph $G^\theta$=(V E, b, $d^\theta$) of graph G=(V, E, b, d) can be constructed. The edge delay is changed as $d^\theta = \lfloor d(e) \cdot \theta \rfloor + 1$ for each edge e. It should be noted that the edge delays are integers and could be solved by TRAMP. Then, following the scaling and rounding technique, n FPTAS for SPRAMP can be found by checking a serial of instances of TRAMP problems. After an FPTAS for SPRAMP is found, approximation schemes for the ORAMP problem can be provided by investigating the relation between SPRAMP and ORAMP.

Figure 11:
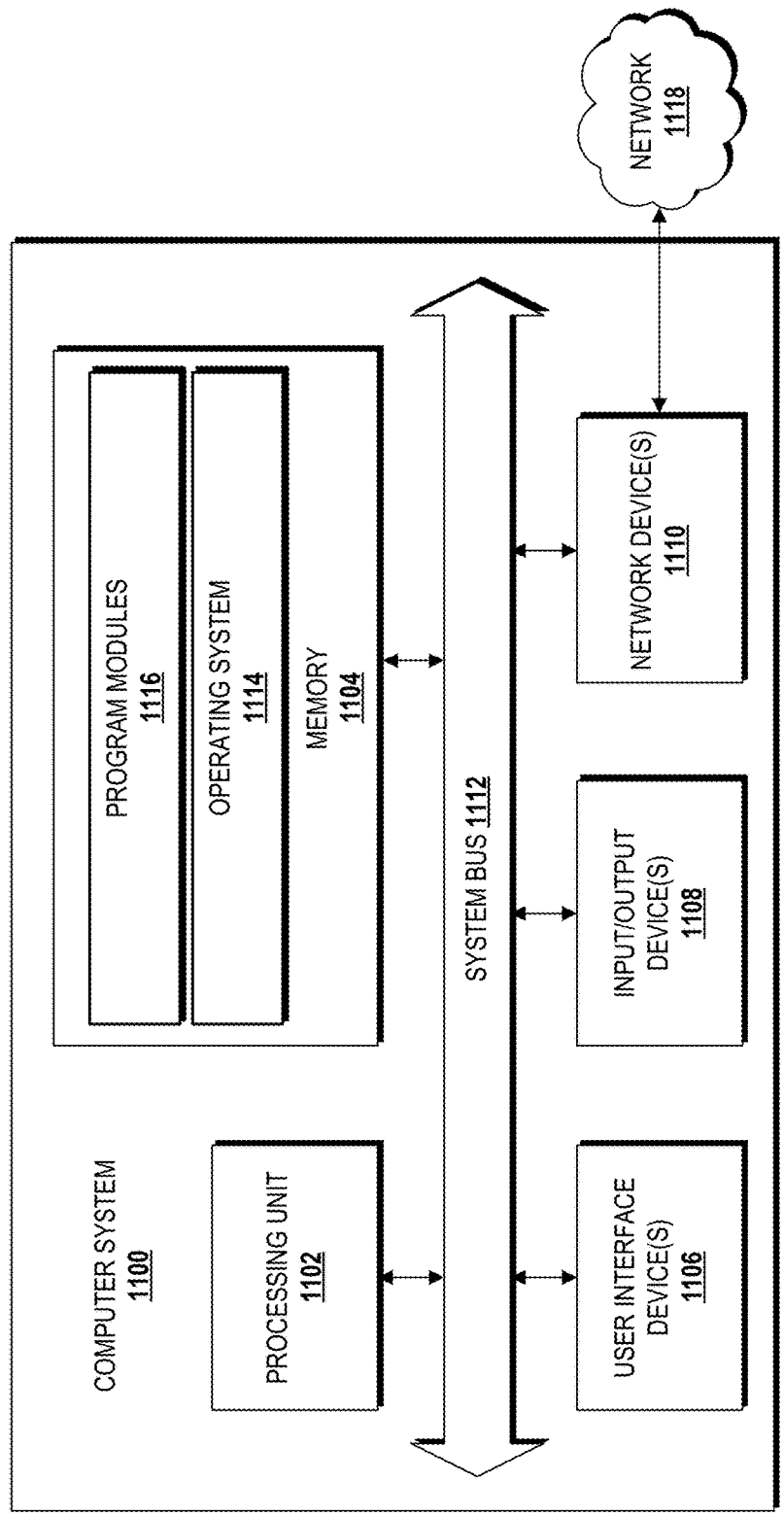
FIG. 11 is a block diagram illustrating an example network planning system and components thereof capable of implementing aspects of the embodiments presented herein.

Turning now to FIG. 11 is a block diagram illustrating a computer system 1100 configured to provide functionality in accordance with various embodiments of the concepts and technologies disclosed herein. The systems, devices, and other components disclosed herein can utilize, at least in part, an architecture that is the same as or at least similar to the architecture of the computer system 1100. In some embodiments, a network planning system that implements the algorithms set forth above can be utilized to create and implement network topologies based upon a multi-tier fault tolerant network design with QoS consideration. It should be understood, however, that modification to the architecture may be made to facilitate certain interactions among elements described herein.

The computer system 1100 includes a processing unit 1102, a memory 1104, one or more user interface devices 1106, one or more I/O devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The illustrated memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1116 may include various software and/or program modules to perform the various operations described herein. The program modules 1116 and/or other programs can be embodied in computer-readable media containing instructions that, when executed by the processing unit 1102, perform various operations such as those described herein. According to embodiments, the program modules 1116 may be embodied in hardware, software, firmware, or any combination thereof.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium" and variations thereof does not include waves or signals per se and/or communication media.

The user interface devices 1106 may include one or more devices with which a user accesses the computer system 1100. The user interface devices 1106 may include, but are not limited to, computers, servers, personal digital assistant ("PDAs"), cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer. In some embodiments, the I/O devices 1108 can be used for manual controls for operations to exercise under certain emergency situations.

The network devices 1110 enable the computer system 1100 to communicate with other networks or remote systems via a network 1118, such as the network service provider network 102 (see FIG. 1) and/or the customer network(s) 204 (see FIG. 2). Examples of the network devices 1110 include, but are not limited to, a modem, a radio frequency ("RF") or infrared ("IR") transceiver, a telephonic interface, a bridge, a router, or a network card. The network 1118 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1118 may be or may include a wired network such as, but not limited to, a Wide Area Network ("WAN"), a wired Personal Area Network ("PAN"), or a wired Metropolitan Area Network ("MAN"). The network 1118 can be or can include the network service provider network 102, the customer network(s) 204, or any other network or combination of networks described herein.

Figure 12:
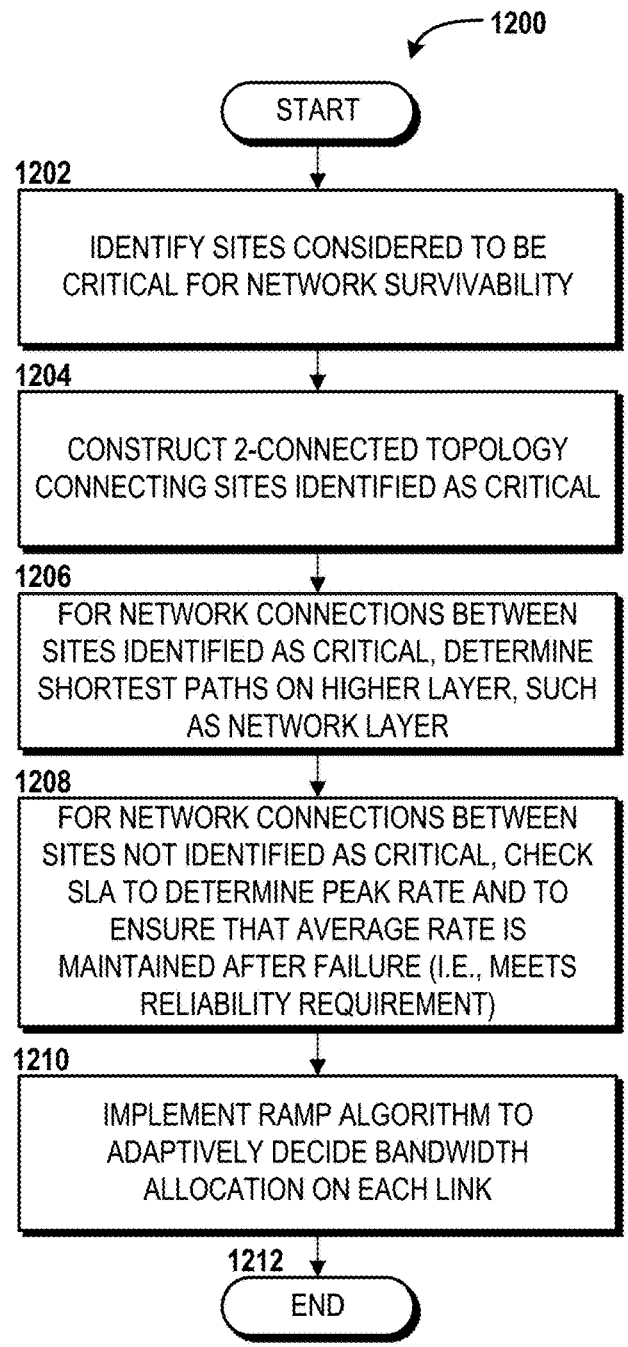
FIG. 12 is a block diagram illustrating a method for constructing a network topology based upon a multi-tier fault tolerant network design with quality of service ("QoS") consideration.

Turning now to FIG. 12, aspects of a method 1200 for constructing a network topology based upon a multi-tier fault tolerant network design with QoS considerations will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 1200 is described as being performed, at least in part, by one or more processors, such as the processing unit 1102, via execution of one or more software modules, such as the program modules 1116. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 1200 begins and proceeds to operation 1202, where a network planning system, such as embodied as the computer system 1100 described above with reference to FIG. 11, identifies one or more sites, such as one or more of the sites 104 described above with reference to FIG. 1, considered to be critical for survivability of the network 102 (also described in FIG. 1). A site can be identified as critical based upon the traffic size served by the site and/or other criteria. Other criteria can include, but are not limited to, geographical location, population, existing infrastructure, and the like.

From operation 1202, the method 1200 proceeds to operation 1204, where the network planning system constructs a 2-connected topology connecting the sites identified in operation 1202 as being critical for network survivability of the network 102. On the physical layer, such as the optical layer, a network service provider can construct a 2-connected topology connecting these critical locations. By using the above-proposed linear-time algorithms (building recovery trees), the network service provider can construct a 2-connected topology with various QoS enhancements.

From operation 1204, the method 1200 proceeds to operation 1206, where the network planning system, for network connection between the sites identified in operation 1202 as being critical for network survivability of the network 102, determine the shortest paths on higher layer of the network 102, such as the network layer. If any link failures occur, these paths will be automatically protected/restored by the physical layer via rerouting using the recovery trees.

From operation 1206, the method 1200 proceeds to operation 1208, where the network planning system, for network connections between sites not identified as being critical for network survivability of the network 102, checks any applicable SLAs to determine the peak rate and to ensure that the average rate (e.g., 30% below the peak rate) is maintained even after failures (i.e., meets reliability requirements).

From operation 1208, the method 1200 proceeds to operation 1210, where the network planning system implements the RAMP algorithm described above to adaptively decide bandwidth allocation on each link within the network topology. From operation 1210, the method 1200 proceeds to operation 1212, where the method 1200 ends.

Figure 13:
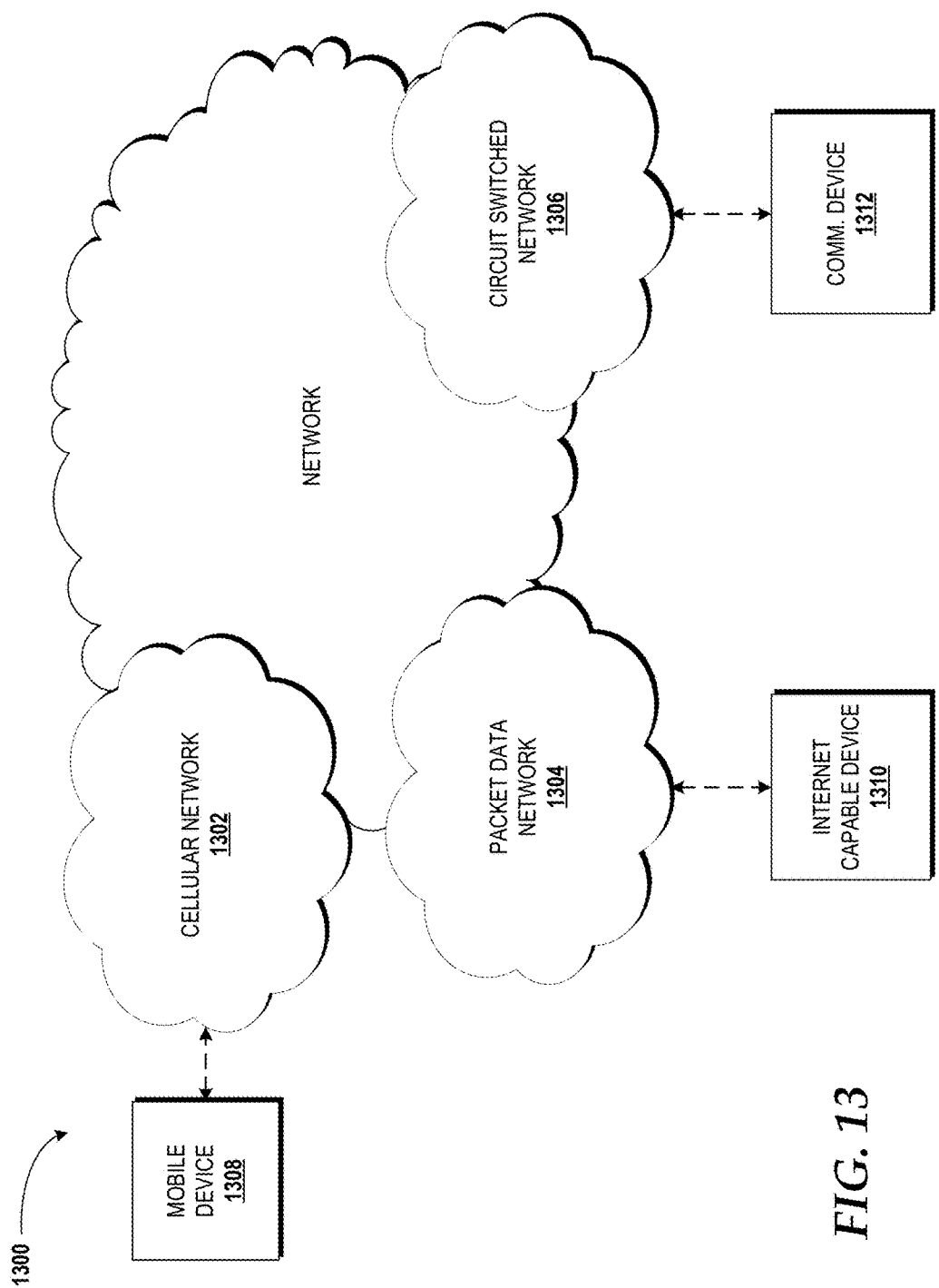
FIG. 13 is a block diagram illustrating an example network capable of implementing aspects of the embodiments presented herein.

Turning now to FIG. 13, details of a network 1300 are illustrated, according to an illustrative embodiment. The network 1300 includes a cellular network 1302, a packet data network 1304, for example, the Internet, and a circuit switched network 1306, for example, a publicly switched telephone network ("PSTN"). The network 1300 can include the network service provider's network 102 (see FIG. 1) and/or the customer networks 204 (see FIG. 2).

The cellular network 1302 can include various components such as, but not limited to, base transceiver stations ("BTSs"), NodeBs, eNodeBs, base station controllers ("BSCs"), radio network controllers ("RNCs"), mobile switching centers ("MSCs"), mobility management entities ("MMEs"), serving gateways ("SGWs"), packet gateways ("PGWs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, general packet radio service ("GPRS") core network components, location service nodes, an IP multimedia subsystem ("IMS"), and the like. The cellular network 1302 also includes radios and nodes for receiving and transmitting voice, data, and combinations thereof to and from radio transceivers, networks, the packet data network 1304, and the circuit switched network 1306.

A mobile communications device 1308, such as, for example, the user device 108, a cellular telephone, a user equipment, a mobile terminal, a PDA, a laptop computer, a handheld computer, and combinations thereof, can be operatively connected to the cellular network 1302. The cellular network 1302 can be configured as a 2G Global System for Mobile communications ("GSM") network and can provide data communications via GPRS and/or Enhanced Data rates for Global Evolution ("EDGE"). Additionally, or alternatively, the cellular network 1302 can be configured as a 3G Universal Mobile Telecommunications System ("UMTS") network and can provide data communications via the High-Speed Packet Access ("HSPA") protocol family, for example, High-Speed Downlink Packet Access ("HSDPA"), enhanced uplink ("EUL") (also referred to as High-Speed Uplink Packet Access "HSUPA"), and HSPA+. The cellular network 1302 also is compatible with 4G and future generation mobile communications standards as well as evolved and future mobile standards.

The packet data network 1304 includes various devices, for example, servers, computers, databases, and other devices in communication with one another, as is generally known. The packet data network 1304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1304 includes or is in communication with the Internet. The circuit switched network 1306 includes various hardware and software for providing circuit switched communications. The circuit switched network 1306 may include, or may be, what is often referred to as a plain old telephone system ("POTS"). The functionality of a circuit switched network 1306 or other circuit-switched network are generally known and will not be described herein in detail.

The illustrated cellular network 1303 is shown in communication with the packet data network 1304 and a circuit switched network 1306, though it should be appreciated that this is not necessarily the case. One or more Internet-capable devices 1310, for example, a PC, a laptop, a portable device, or another suitable device, can communicate with one or more cellular networks 1302, and devices connected thereto, through the packet data network 1304. It also should be appreciated that the Internet-capable device 1310 can communicate with the packet data network 1304 through the circuit switched network 1306, the cellular network 1302, and/or via other networks (not illustrated).

As illustrated, a communications device 1312, for example, a telephone, facsimile machine, modem, computer, or the like, can be in communication with the circuit switched network 1306, and therethrough to the packet data network 1304 and/or the cellular network 1302. It should be appreciated that the communications device 1312 can be an Internet-capable device, and can be substantially similar to the Internet-capable device 1310. In the specification, the network 1300 is used to refer broadly to any combination of the networks 1302, 1304, 1306. It should be appreciated that substantially all of the functionality described with reference to the network 1300 can be performed by the cellular network 1302, the packet data network 1304, and/or the circuit switched network 1306, alone or in combination with other networks, network elements, and the like.

Based on the foregoing, it should be appreciated that concepts and technologies directed to multi-tier fault tolerant network design with QoS considerations have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
identifying, by a network planning system comprising a processor, at least one site of a plurality of sites as a critical site, wherein the critical site is considered to be critical for survivability of a network comprising the plurality of sites, and wherein each of the plurality of sites comprises a node;
constructing, by the network planning system, a topology that connects the plurality of sites;
determining, by the network planning system, a shortest path for each of a plurality of network links in the topology that comprises the critical site;
checking, by the network planning system, a service level agreement to determine a reliability requirement for each of the plurality of network links in the topology that is not connected to the critical site; and
implementing, by the network planning system, a reliable adaptive multipath provisioning algorithm to adaptively determine a bandwidth allocation on each of the plurality of network links in the topology based, at least in part, upon the shortest path and the reliability requirement.

2. The method of claim 1, wherein identifying, by the network planning system, the at least one site as the critical site is based, at least in part, upon a traffic size served by the at least one site.

3. The method of claim 1, wherein identifying, by the network planning system, the at least one site as the critical site is based, at least in part, upon a geographical location of the at least one site.

4. The method of claim 1, wherein identifying, by the network planning system, the at least one site as the critical site is based, at least in part, upon a population served by the at least one site.

5. The method of claim 1, wherein the topology comprises a 2-connected graph.

6. The method of claim 1, wherein the reliable adaptive multipath provisioning algorithm comprises an integer reliable adaptive multipath provisioning algorithm.

7. The method of claim 1, wherein the topology is based, at least in part, upon a multi-tier network fault tolerant design comprising a first tier associated with a physical layer of the network and a second tier associated with a network layer of the network.

8. A computer-readable storage medium comprising computer-executable instructions that, when executed by a processor, cause the processor to perform operations comprising:
identifying at least one site of a plurality of sites as a critical site, wherein the critical site is considered to be critical for survivability of a network comprising the plurality of sites, and wherein each of the plurality of sites comprises a node;
constructing a topology that connects the plurality of sites;
determining a shortest path for each of a plurality of network links in the topology that comprises the critical site;
checking a service level agreement to determine a reliability requirement for each of the plurality of network links in the topology that is not connected to the critical site; and
implementing a reliable adaptive multipath provisioning algorithm to adaptively determine a bandwidth allocation on each of the plurality of network links in the topology based, at least in part, upon the shortest path and the reliability requirement.

9. The computer-readable storage medium of claim 8, wherein identifying the at least one site as the critical site is based, at least in part, upon a traffic size served by the at least one site.

10. The computer-readable storage medium of claim 8, wherein identifying the at least one site as the critical site is based, at least in part, upon a geographical location of the at least one site.

11. The computer-readable storage medium of claim 8, wherein identifying the at least one site as the critical site is based, at least in part, upon a population served by the at least one site.

12. The computer-readable storage medium of claim 8, wherein the topology comprises a 2-connected graph.

13. The computer-readable storage medium of claim 8, wherein the reliable adaptive multipath provisioning algorithm comprises an integer reliable adaptive multipath provisioning algorithm.

14. The computer-readable storage medium of claim 8, wherein the topology is based, at least in part, upon a multi-tier network fault tolerant design comprising a first tier associated with a physical layer of the network and a second tier associated with a network layer of the network.

15. A network planning system comprising:
a processor; and
memory that stores instructions that, when executed by the processor, causes the processor to perform operations comprising
identifying at least one site of a plurality of sites as a critical site, wherein the critical site is considered to be critical for survivability of a network comprising the plurality of sites, and wherein each of the plurality of sites comprises a node,
constructing a topology that connects the plurality of sites,
determining a shortest path for each of a plurality of network links in the topology that comprises the critical site, checking a service level agreement to determine a reliability requirement for each of the plurality of network links in the topology that is not connected to the critical site, and implementing a reliable adaptive multipath provisioning algorithm to adaptively determine a bandwidth allocation on each of the plurality of network links in the topology based, at least in part, upon the shortest path and the reliability requirement.

16. The network planning system of claim 15, wherein identifying the at least one site as the critical site is based, at least in part, upon a traffic size served by the at least one site.

17. The network planning system of claim 15, wherein identifying the at least one site as the critical site is based, at least in part, upon a geographical location of the at least one site.

18. The network planning system of claim 15, wherein identifying the at least one site as the critical site is based, at least in part, upon a population served by the at least one site.

19. The network planning system of claim 15, wherein the topology comprises a 2-connected graph.

20. The network planning system of claim 15, wherein the topology is based, at least in part, upon a multi-tier network fault tolerant design comprising a first tier associated with a physical layer of the network and a second tier associated with a network layer of the network.

* * * * *